US010841967B2

(12) United States Patent
Teyeb et al.

(10) Patent No.: US 10,841,967 B2
(45) Date of Patent: Nov. 17, 2020

(54) PROTOCOLS AND ARCHITECTURES FOR NR-NR DUAL CONNECTIVITY (NR-DC)

(71) Applicant: Telefonaktiebolaget LM Ericsson (publ), Stockholm (SE)

(72) Inventors: Oumer Teyeb, Solna (SE); Matteo Fiorani, Solna (SE); Gunnar Mildh, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/464,330

(22) PCT Filed: Apr. 12, 2019

(86) PCT No.: PCT/SE2019/050338
§ 371 (c)(1),
(2) Date: May 28, 2019

(87) PCT Pub. No.: WO2019/216802
PCT Pub. Date: Nov. 14, 2019

(65) Prior Publication Data
US 2020/0120732 A1      Apr. 16, 2020

Related U.S. Application Data

(60) Provisional application No. 62/669,436, filed on May 10, 2018.

(51) Int. Cl.
*H04L 12/28*      (2006.01)
*H04W 76/15*      (2018.01)
*H04W 88/08*      (2009.01)

(52) U.S. Cl.
CPC .......... *H04W 76/15* (2018.02); *H04W 88/085* (2013.01)

(58) Field of Classification Search
CPC ....................................................... H04L 12/50
(Continued)

(56) References Cited

U.S. PATENT DOCUMENTS

2020/0146059 A1*    5/2020    Cirik ................... H04W 72/085

FOREIGN PATENT DOCUMENTS

WO      2017171354 A1      10/2017
WO      2018030798 A1       2/2018

OTHER PUBLICATIONS

WO 2017/171354 A, LG Electronics Inc, pp. 1-26, Oct. 5, 2017 ( See translation).*

(Continued)

*Primary Examiner* — Dang T Ton
(74) *Attorney, Agent, or Firm* — Murphy, Bilak & Homiller, PLLC

(57) ABSTRACT

Exemplary embodiments include methods and/or procedures performed by a first centralized unit, CU, in a radio access network for configuring a user equipment, UE, to communicate via a plurality of distributed units, DUs. Such embodiments include initiating a first radio resource control, RRC, entity to communicate with the UE via a first DU. Such embodiments also include selecting a second DU to communicate with the UE in a dual-connectivity, DC, configuration with the first DU. Such embodiments also include, based on whether the selected second DU is associated with the first CU, determining whether to initiate a second RRC entity, within the first CU, to communicate with the UE via the second DU. Other embodiments include complementary methods and/or procedures performed by UEs; CUs and UEs configured to perform such methods and/or procedures; and computer-readable media storing instructions corresponding to such methods and/or procedures.

26 Claims, 15 Drawing Sheets

(58) Field of Classification Search
USPC .......................................................... 370/400
See application file for complete search history.

(56) References Cited

OTHER PUBLICATIONS

"3GPP TS 38.331 V15.1.0"; 3rd Generation Partnership Project; Technical Specification Group Radio Access Network; NR; Radio Resource Control (RRC) protocol specification (Release 15), Mar. 2018, pp. 1-268.

"TS 23.501 V15.1.0"; 3rd Generation Partnership Project; Technical Specification Group Services and System Aspects; System Architecture for the 5G System; Stage 2 (Release 15), Mar. 2018, pp. 1-201.

"3GPP TR 38.801 V1.2.0", 3rd Generation Partnership Project; Technical Specification Group Radio Access Network; Study on New Radio Access Technology; Radio Access Architecture and Interfaces (Release 14), Feb. 2017, pp. 1-90.

"3GPP TR 38.806 V15.0.0", 3rd Generation Partnership Project; Technical Specification Group Radio Access Network; Study of separation of NR Control Plane (CP) and User Plane (UP) for split option 2; (Release 15), Dec. 2017, pp. 1-22.

"3GPP TS 36.300 V15.1.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), Mar. 2018, pp. 1-341.

"3GPP TS 38.304 v1.0.1", 3rd Generation Partnership Project; Technical Specification Group Radio Access Network; NR; User Equipment (UE) procedures in Idle mode and RRC Inactive state (Release 15), Apr. 2018, pp. 1-21.

"3GPP TS 38.401 V15.4.0", 3rd Generation Partnership Project; Technical Specification Group Radio Access Network; NG-RAN; Architecture description (Release 15), Dec. 2018, pp. 1-40.

"Baseline CR for Jun. version of TS 38.401 covering agreements of RAN3#99bis on CPUP_Split", 3GPP TSG-RAN#99bis, R3-182518, Sanya, China, Apr. 16-20, 2018, pp. 1-28.

* cited by examiner

PROTOCOLS AND ARCHITECTURES FOR NR-NR DUAL CONNECTIVITY (NR-DC)

TECHNICAL FIELD

Embodiments of the present disclosure generally relate to wireless communication networks, and more specifically to establishing connections between a single user equipment (UE) and multiple base stations in a wireless communication network.

INTRODUCTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

In LTE, the Radio Resource Control (RRC) protocol is used to configure, setup, and maintain the radio connection between the user equipment (UE) and the base station, known as the evolved Node B (eNB). When the UE receives an RRC message from the eNB, it will apply the configuration (also referred to herein as "compile the configuration"), and if this succeeds the UE generates an RRC complete message that indicates the transaction ID of the message that triggered this response.

Since LTE Release 8, three Signaling Radio Bearers (SRBs), namely SRB0, SRB1 and SRB2 have been available for the transport of RRC and Non Access Stratum (NAS) messages between the UE and eNB. A new SRB, known as SRB1*bis*, was also introduced in rel-13 for supporting DoNAS (Data Over NAS) in NB-IoT.

SRB0 carries RRC messages using the CCCH logical channel, and it is used for handling RRC connection setup, resume, and re-establishment. Once the UE is connected to the eNB (i.e., RRC connection setup or RRC connection reestablishment/resume has succeeded), SRB1 is used for handling further RRC messages (which may include a piggybacked NAS message) and NAS messages, prior to the establishment of SRB2, all using DCCH logical channel SRB2 is used for RRC messages such as logged measurement information, as well as for NAS messages, all using DCCH. SRB2 has a lower priority than SRB1, because logged measurement information and NAS messages can be lengthy and could cause the blocking of more urgent and smaller SRB1 messages. SRB2 is always configured by E-UTRAN after security activation.

A feature added in LTE Rel-10 (Rel-10) is support for bandwidths larger than 20 MHz, while remaining backward compatible with Rel-8. As such, a wideband LTE Rel-10 carrier (e.g., wider than 20 MHz) should appear as a number of carriers (referred to as "component carriers" or "CCs") to an LTE Rel-8 terminal. For an efficient use of a wideband Rel-10 carrier, legacy (e.g., Rel-8) terminals can be scheduled in all parts of the wideband LTE Rel-10 carrier. One way to achieve this is by means of Carrier Aggregation (CA), whereby an LTE Rel-10 terminal can receive multiple CCs, each preferably having the same structure as a Rel-8 carrier.

In the context of LTE, a primary serving cell (PCell, e.g., PCell1) is defined as the "main" cell serving the wireless device such that both data and control signaling can be transmitted over the PCell, while one or more supplementary or secondary serving cells (SCells, e.g., SCell2 and SCell3) are typically used for transmitting data only, the Scell(s) providing extra bandwidth to enable greater data throughput. A CA-capable UE is assigned a PCell (e.g., PCell1) that is always activated, and one or more SCells (e.g., SCell2 and/or SCell3) which can be activated or deactivated dynamically.

The number of aggregated CCs as well as the bandwidth of individual CCs can be different for uplink and downlink. A "symmetric configuration" refers to the case where the number of CCs in downlink and uplink is the same, whereas an "asymmetric configuration" refers to the case that the number of CCs is different. Furthermore, the number of CCs configured in a cell may be different from the number of CCs seen by a terminal. For example, a terminal can support more downlink CCs than uplink CCs, even though the cell is configured with the same number of uplink and downlink CCs.

A dual connectivity (DC) framework has been defined in Release 12 of the standards for the Evolved Universal Terrestrial Radio Access Network (E-UTRAN), which is widely referred to as Long Term Evolution (LTE). Dual connectivity refers to a mode of operation in which a given UE, while in RRC_CONNECTED state, consumes radio resources provided by at least two different network points connected to one another with a non-ideal backhaul. In the LTE standards, these two network points may be referred to as a "Master eNB" (MeNB) and a "Secondary eNB" (SeNB). DC can be viewed as a special case of carrier aggregation, where the aggregated carriers, or cells, are provided by network nodes that are physically separated from one another and that are not connected to one another through a fast, quality, connection.

More specifically, dual connectivity (DC) is a mode of operation of a UE in RRC_CONNECTED state, where the UE is configured with a Master Cell Group (MCG) and a Secondary Cell Group (SCG). A Cell Group (CG) is a group of serving cells associated with either the MeNB or the SeNB(s). A Master Cell Group (MCG) is a group of serving cells associated with the MeNB, comprising a primary cell (PCell) and optionally one or more secondary cells (SCells). A Secondary Cell Group (SCG) is a group of serving cells associated with the SeNB comprising a Primary Scell (pS-Cell) and optionally one or more SCells.

The term "Special Cell" (or "SpCell" for short) refers to the PCell of the MCG or the PSCell of the SCG depending on whether the UE's MAC entity is associated with the MCG or the SCG, respectively. In non-DC operation (e.g., CA), SpCell refers to the PCell. An SpCell is always activated and supports physical uplink control channel (PUCCH) transmission and contention-based random access by UEs.

Put another way, a UE in DC maintains simultaneous connections to anchor and booster nodes, where the anchor node is also referred to as the MeNB and the booster nodes are also referred to as SeNBs. As its name implies, the MeNB terminates the control plane connection towards the UE and, as such, is the controlling node of the UE, including handovers to and from SeNBs. For example, the MeNB is the eNB that terminates at least the S1-MME connection, i.e., the connection between the eNB and the Mobility Management Entity (MME) for the UE. An SeNB is an eNB that is providing additional radio resources (e.g., bearers) for the UE but that is not the MeNB. Types of radio resource bearers include MCG bearers, SCG bearers, and split bearers.

RRC connection with the UE is handled only by the MeNB and, accordingly, SRBs (Signaling Radio Bearers) are always configured as MCG bearer type and therefore only use the radio resources of the MN. However, the MeNB can also configure the UE based on input from the SeNB and hence the SeNB can also indirectly control the UE. In a LTE-DC configuration, the MeNB is connected to the SeNBs via the Xn interface, which is currently selected to be the same as the X2 interface between the two eNBs.

According to LTE principles, UEs provide measurement reports—whether due to event trigger or a periodic trigger—comprising measurements of serving cell(s). For UE in LTE-DC, serving cell means both cells in MCG (MN) and cell in SCG (SN). For mobility measurement, a MeNB configures a UE according to various criteria including, e.g., frequency to measure, how to report, etc. Correspondingly, the UE sends measurement results to MeNB once the measurement criteria are met. According to LTE principles, when the UE needs to send a measurement report, whether event- or periodic-triggered, the UE should always send measurement results of serving cell to network. For UE in LTE-DC, serving cell means both cells in MCG (MN) and cell in SCG (SN).

FIG. 1A illustrates various exemplary LTE DC scenarios involving UEs 100 (e.g., 100a-d) and base stations (eNBs) 110 (e.g., 110a-e). As shown, only one SeNB (at most) is connected to any of the illustrated UEs. However, more than one SeNB can serve a UE in general. Moreover, only one cell each from both MeNB and SeNB are shown to be serving the UE, however more than one cells can serve the UE in practice from both MeNB and SeNB. From the figure, it should also be clear that dual connectivity is a UE-specific feature and that a given network node (or a serving cell) can support a dual-connected UE and a legacy UE at the same time. In other words, MeNB and SeNB are roles played, or functions provided, by eNBs 110 in a particular situation, e.g., with respect to a particular UE. Thus, while the eNBs 110 in FIG. 1a are labeled "MeNB" and "SeNB," this indicates only that they are playing this role for at least one UE 100. Indeed, a given eNB 110 may be an MeNB for one UE while being an SeNB for another UE.

The master/anchor and secondary/booster roles are defined from a UE's point of view, which means that a node (or cell) that acts as an anchor to one UE may act as booster to another UE. Likewise, although a given UE in a DC scenario reads system information from the anchor node (or cell), a node (or cell) acting as a booster to one UE may or may not distribute system information to another UE. Furthermore, in LTE, only inter-frequency DC is supported (i.e. the MCG and SCG must use different carrier frequencies).

In summary, DC allows an LTE-capable UE to be connected to two nodes—MeNB and SeNB—to receive data from both nodes and thereby increase its data rate. The MeNB (or MN) provides system information, terminates the control plane, and can terminate the user plane. An SeNB (or SN), on the other hand, terminates only the user plane. The aggregated user plane (UP) protocol stack for LTE DC is illustrated in FIG. 1B. This UP aggregation achieves benefits such as increasing the per user throughput for users that have good channel conditions and the capability of receiving and transmitting at higher data rates than can be supported by a single node, even without a low-latency backhaul/network connection between the MeNB and SeNB.

In 3GPP, a study item on a new radio interface for 5G has recently been completed and 3GPP has now continued with the effort to standardize this new radio interface, often abbreviated by NR (New Radio). 3GPP TR 38.304 describes various exemplary DC scenarios or configurations where the MN and SN are applying either NR, LTE or both. The following terminology is used to describe these exemplary DC scenarios or configurations:
- DC: LTE DC (i.e. both MN and SN employ LTE, as discussed above);
- EN-DC: LTE-NR dual connectivity where LTE is the master and NR is the secondary;
- NE-DC: LTE-NR dual connectivity where NR is the master and LTE is the secondary;
- NR-DC (or NR-NR DC): both MN and SN employ NR; and
- MR-DC (multi-RAT DC): a generic term to describe where the MN and SN employ different RATs (EN-DC and NE-DC are two different example cases of MR-DC).

The standardization of standalone NR and NR-DC (also referred to as "NR-NR DC") is still ongoing in 3GPP, with the architecture for NR-DC not yet defined. For example, with respect to RRC termination, it has not been decided whether NR-DC will utilize a single, MN-terminated RRC (e.g., similar to LTE DC, discussed above) or an RRC terminated at both MN and SN, utilizing a direct SRB between SN and UE (e.g., similar to EN-DC, discussed below). Moreover, the combination of NR-DC with new NR base station (referred to as "gNB") split architecture is expected to create various difficulties, issues and/or ambiguities in the operation of UEs and/or networks.

SUMMARY

Exemplary embodiments disclosed herein address these problems, issues, and/or drawbacks of existing solutions by providing a flexible and efficient approach for providing dual connectivity (DC), in a transparent manner, from two nodes of a radio access network (RAN) to a wireless device and/or user equipment (UE). For example, NR-DC can be provided in manner that, for UEs, is independent of the specific CU/DU split architecture being used, including whether or not the two utilized DUs are controlled by and/or associated with the same CU. This can facilitate unified and consistent UE behavior for handling dual RRC instances, regardless of where the two RRC instances are terminated in the network. Consequently, this specific improvement reduces implementation and testing effort required for UEs, which facilitates earlier market introduction of such features.

Exemplary embodiments of the present disclosure include methods and/or procedures for configuring a user equipment (UE) to communicate via a plurality of distributed units (DUs). The exemplary methods and/or procedures can be performed a first centralized unit (CU) of a base station (e.g., gNB, en-gNB, eNB, ng-eNB, etc.) in a radio access network (RAN, e.g., NG-RAN, E-UTRAN, etc.).

The exemplary methods and/or procedures can include initiating a first Radio Resource Control (RRC) entity to communicate with the UE via a first DU. In some embodiments, the exemplary method and/or procedure can also include establishing a first radio bearer with the UE via the first DU. The first radio bearer can be a signaling radio bearer (SRB) associated with the first RRC entity. In some embodiments, the exemplary method and/or procedure can also include receiving, from the UE via the first radio bearer, radio measurements relating to one or more further DUs.

The exemplary method and/or procedure can also include selecting a second DU to communicate with the UE in a dual-connectivity (DC) configuration together with the first DU. In some embodiments, the second DU can be selected from the one or more further DUs based on the radio measurements. The exemplary method and/or procedure can also include, based on whether the selected second DU is associated with the first CU, determining whether to initiate a second RRC entity, within the first CU, to communicate with the UE via the second DU. In some embodiments, determining whether to establish one or more further radio bearers, with the UE via the second DU, can also be based on whether the selected second DU is associated with the first CU.

In some embodiments, the exemplary method and/or procedure can also include performing one or more operations if the second DU is associated with the first CU. In various embodiments, these operations can include: initiating the second RRC entity within the first CU; establishing a second SRB in association with the second RRC entity; and sending, to the UE via the first DU, an RRC message associated with the first RRC entity that comprises an encapsulated RRC message associated with the second RRC entity. Various other operations are also possible.

In some embodiments, the exemplary method and/or procedure can also include, if the second DU is not associated with the first CU, sending a request to establish the one or more further radio bearers via the second DU.

Other exemplary embodiments of the present disclosure include methods and/or procedures for a user equipment (UE) to communicate via a plurality of distributed units (DUs) in a radio access network (RAN). The exemplary method and/or procedure shown in FIG. 19 can be performed a UE (e.g., wireless device, IoT device, modem, etc. or component thereof) operating in a RAN.

The exemplary methods and/or procedures can include initiating a first Radio Resource Control (RRC) entity to communicate with a corresponding first RRC entity in a first centralized unit (CU) via a first distributed unit (DU). For example, the first DU can be associated with the first CU. In some embodiments, the exemplary method and/or procedure can also include establishing a first radio bearer with the first CU via the first DU. The first radio bearer can be a first signaling radio bearer (SRB) associated with the first RRC entity. In some embodiments, the exemplary method and/or procedure can also include sending, to the first CU via the first radio bearer, radio measurements relating to one or more further DUs.

The exemplary method and/or procedure can also include receiving, from the first RRC entity in the first CU, at least one message comprising an encapsulated RRC message that is associated with a second RRC entity in the first CU. The encapsulated RRC message can also include information related to a second DU associated with the first CU. In some embodiments, the second DU can be one of the further DUs for which the UE sent radio measurements.

The exemplary method and/or procedure can also include initiating a second RRC entity, in the UE, to communicate with the second RRC entity in the first CU via the second DU. In some embodiments, the exemplary method and/or procedure can also include establishing one or more further radio bearers with the first CU via the second DU.

Other exemplary embodiments include base station centralized units (CUs, e.g., gNB-CUs) and user equipment (UEs, e.g., wireless devices, IoT devices, modems, etc. or components thereof) configured to perform operations corresponding to any of the exemplary methods and/or procedures described above. Other exemplary embodiments include non-transitory, computer-readable media storing program instructions that, when executed by at least one processor comprising a CU or a UE, configure the CU or the UE to perform operations corresponding to any of the exemplary methods and/or procedures described above.

These and other objects, features and advantages of the exemplary embodiments of the present disclosure will become apparent upon reading the following detailed description of the exemplary embodiments of the present disclosure.

DETAILED DESCRIPTION

Figure 1A:
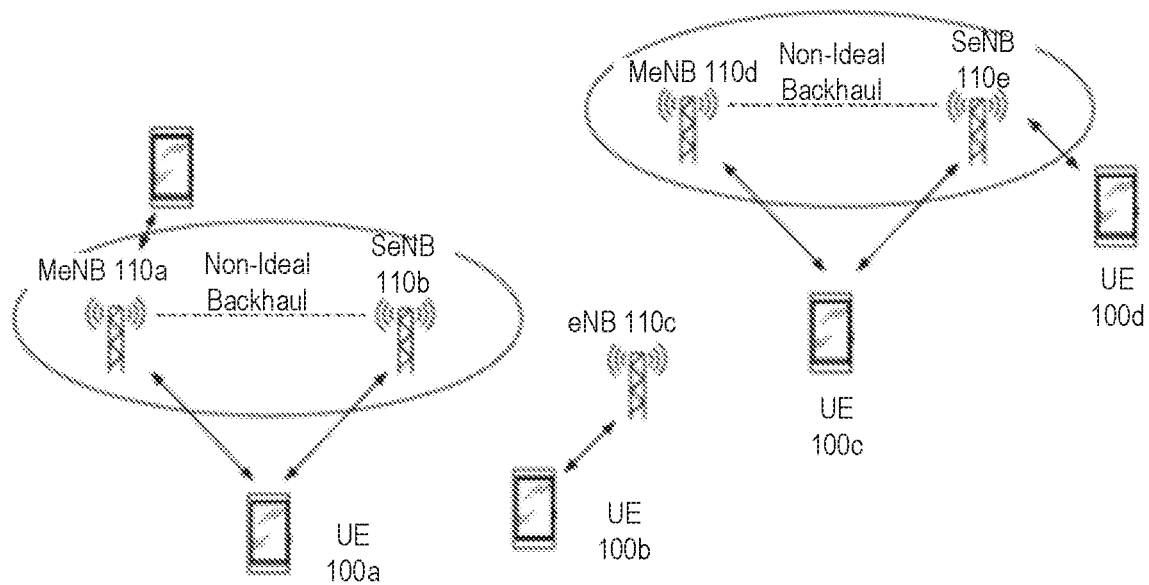
FIG. 1A is a high-level network diagram illustrating various exemplary Long-Term Evolution (LTE) dual connectivity (DC) scenarios involving user equipment (UEs) and evolved NodeBs (eNBs).
Figure 1B:
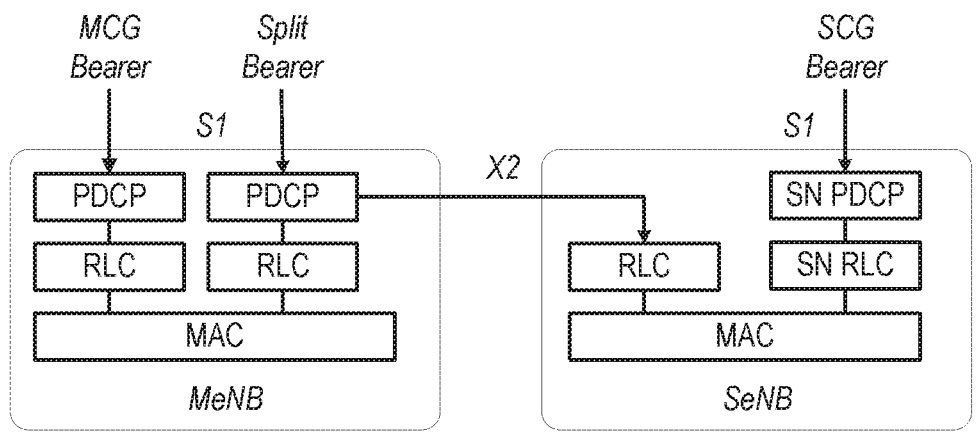
FIG. 1B illustrates an exemplary user plane (UP) protocol stack for LTE DC, such as shown in FIG. 1A.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

- Radio Node: As used herein, a "radio node" can be either a "radio access node" or a "wireless device."
- Radio Access Node: As used herein, a "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), and a relay node.
- Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.
- Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a UE in a 3GPP network and a Machine Type Communication (MTC) device.
- Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR concepts) beams may be used instead of cells and, as such, concepts described herein apply equally to both cells and beams.

As briefly mentioned above, the standardization of stand-alone NR and NR-DC (also referred to as "NR-NR DC") is still ongoing in 3GPP, with the architecture for NR-DC not yet defined. For example, with respect to RRC termination, it has not been decided whether NR-DC will utilize a single, MN-terminated RRC (e.g., similar to LTE DC, discussed above) or an RRC terminated at both MN and SN, utilizing a direct SRB between SN and UE (e.g., similar to EN-DC, discussed below). Moreover, the combination of NR-DC with new NR base station (referred to as "gNB") split architecture is expected to create various difficulties, issues, and/or ambiguities in the operation of UEs and/or networks. These are discussed in more detail below.

LTE-NR tight interworking (a form of EN-DC, with the terms being used interchangeably herein) is currently being discussed for Release 15. In this context, the major changes from LTE DC are the introduction of:

- Split UP bearer from the SN, also referred to as SCG split bearer. In this case, the SN is also referred to as a SgNB (secondary gNB), where gNB is an acronym for NR base station.
- Split RRC bearer (i.e., one RRC connection via MN and SN lower layers), also referred to as split SRB; and
- Direct RRC connection between SN and UE, also referred to as SCG SRB, direct SRB, or SRB3.

Figure 2A:
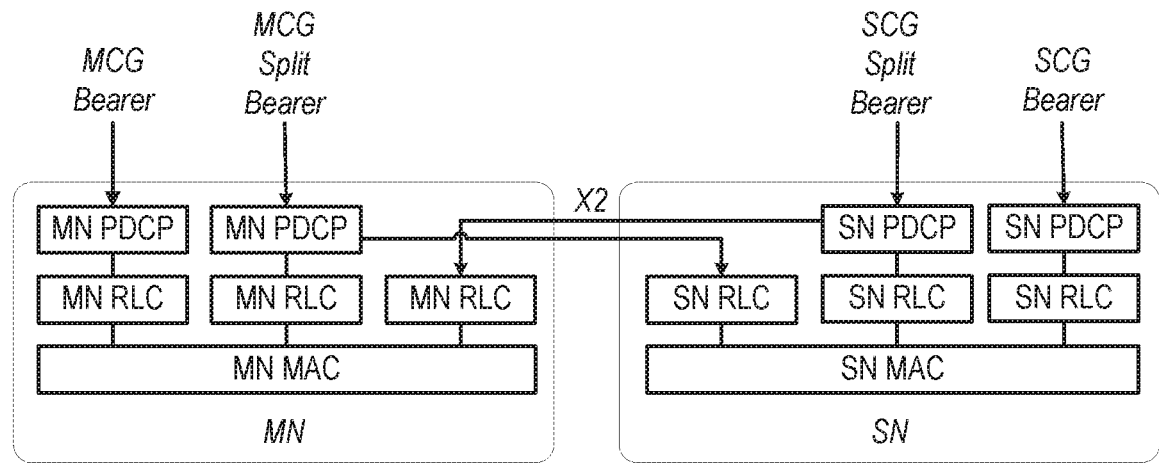
FIGS. 2A and 2B show exemplary User Plane (UP) and Control Plane (CP) architectures, respectively, for LTE-New Radio (LTE-NR) tight interworking.
Figure 2B:
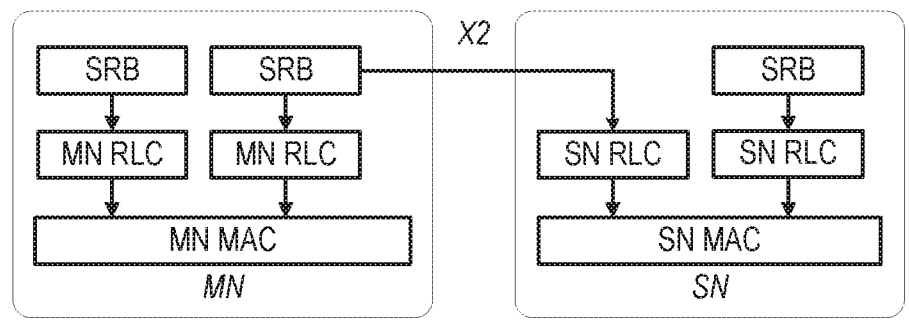
Figure 3:
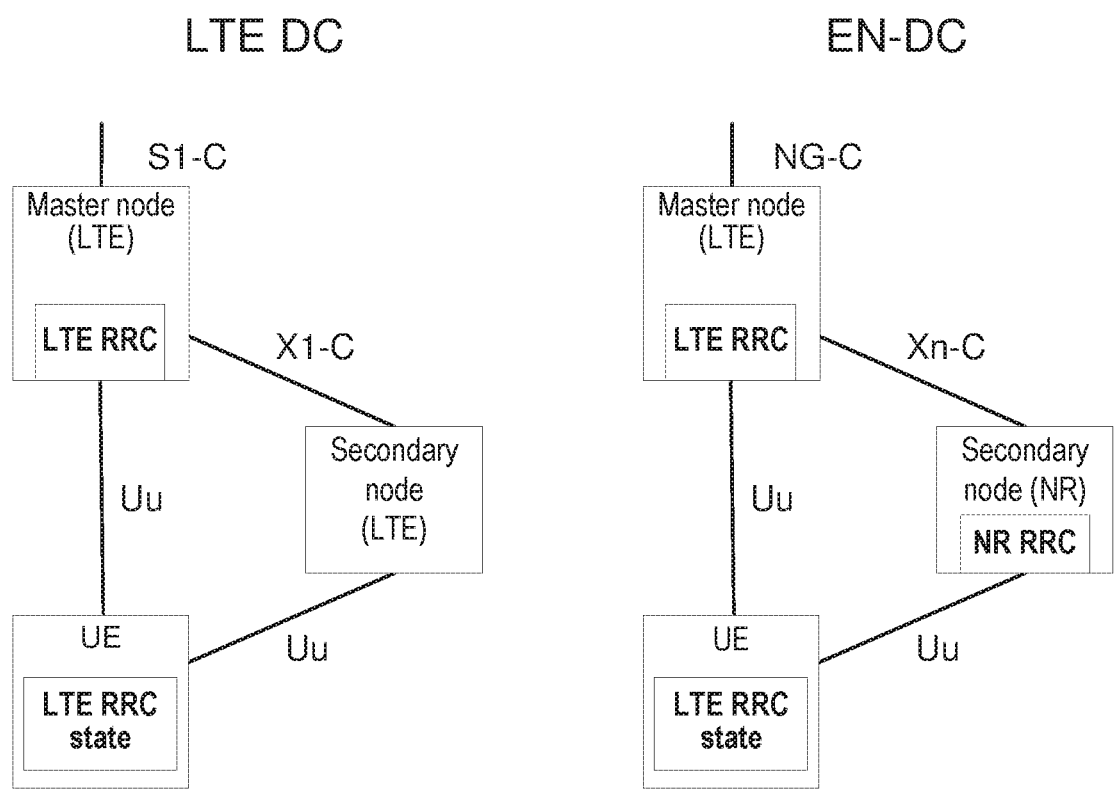
FIG. 3 is a block diagram showing a high-level comparison between CP architectures in LTE DC and LTE-NR DC (also referred to as EN-DC).

FIGS. 2A and 2B show exemplary User Plane (UP) and Control Plane (CP) architectures, respectively, for LTE-NR tight interworking. FIG. 3 is a block diagram showing a high-level comparison of CP architectures in LTE DC and EN-DC. For the first phase of 5G standardization and 5G deployment, the most likely scenario is that MN will apply LTE, and the SN will apply the NR interface. Nevertheless, it should be appreciated that the explanation can equally apply to various scenarios where the MN and SN nodes utilize various radio interface technologies, e.g., both MN and SN can utilize LTE, NR, and/or other technologies, each without restriction by the other node. In some exemplary embodiments, the MN and/or SN can be subject to the RAN split architecture (e.g., CU and DU), discussed in greater detail below.

As shown in FIG. 2A, a MN can forward UP bearer traffic (e.g., on a PDCP layer) to a SN over the X2 interface, while a SN can likewise forward PDCP traffic to a MN over the X2 interface. In the first stages of EN-DC standardization/implementation, however, a likely scenario is that the NR SN is not connected directly to the 5G core network (5GC), but all UP traffic between the UE and SN is carried via the X2 interface to/from the LTE MN and, eventually, to the LTE Evolved Packet Core (EPC) network. Subsequently, DC scenarios involving NR SNs (or NR MNs) carrying UP traffic directly to/from the 5GC may be standardized for implementation.

Similarly, FIG. 2B illustrates that a UE can receive CP traffic via separate SRBs from the MN and SN. This means that a UE can receive signaling messages, such as Radio Resource Control (RRC) messages, both from the MN and the SN. Consequently, in the EN-DC CP scenario shown in FIG. 2B, there are two RRC instances responsible for controlling the UE—one directed from the MN and another from the SN. A consequence is that the UE needs to terminate RRC signaling from both from the MN and the SN.

One motivation for introducing such multiple RRC instances in NR DC, and in particular for EN-DC, is to enable the MN and SN to semi-autonomously control radio resources. For example, the MN can allocate resources from some spectrum using LTE, while the SN can be responsible for configuring and allocating resources from some other spectrum that uses NR. Challenges for allocating resources in LTE and NR may differ substantially. For example, NR might be allocated in a spectrum where beamforming is highly desirable, while LTE might be allocated in a spectrum with good coverage but with very congested resources. As such, it is important that the SN has some level of autonomy to configure and manage the UE on its associated resources. On the other hand, the overall responsibility for connectivity to the UE may remain with MN node, such the MN node has overall responsibility for mobility, state changes of the UE, meeting quality of service demands, etc.

Another motivation of introducing split RRC bearers is to provide "RRC diversity" that can enable better mobility robustness and improved signaling/control message delivery between the network and the UE. For example, an RRC message (e.g., handover message or any other reconfiguration message) can be sent over the better of the two links, MeNB-UE and SgNB-UE, even if one link has deteriorated significantly. It is also possible to send duplicate messages over both MeNB-UE and SgNB-UE to achieve a better success-rate and faster delivery if the links are error prone. Such benefits of "RRC diversity" are not available in the current LTE DC solution, and 3GPP has therefore undertaken the challenge to enable such RRC diversity. Having RRC diversity may prove particularly important for use cases requiring ultra-reliable connections with low latency, often called URLLC (Ultra Reliable Low Latency Communication).

As illustrated in FIG. 2B, in the split-RRC-bearer CP architecture, RRC messages generated and/or transmitted from the MN can be sent either via the MeNB-UE (LTE) link, or relayed over an X2 interface to be sent on the SgNB-UE (NR) link. The MN LTE PDCP layer is responsible for steering each RRC message to the appropriate link. The messages received over the different paths in the UE are then combined at the LTE PDCP layer and then forwarded to the RRC layer for further processing. A similar approach can be used in the UE uplink.

Figure 4A:
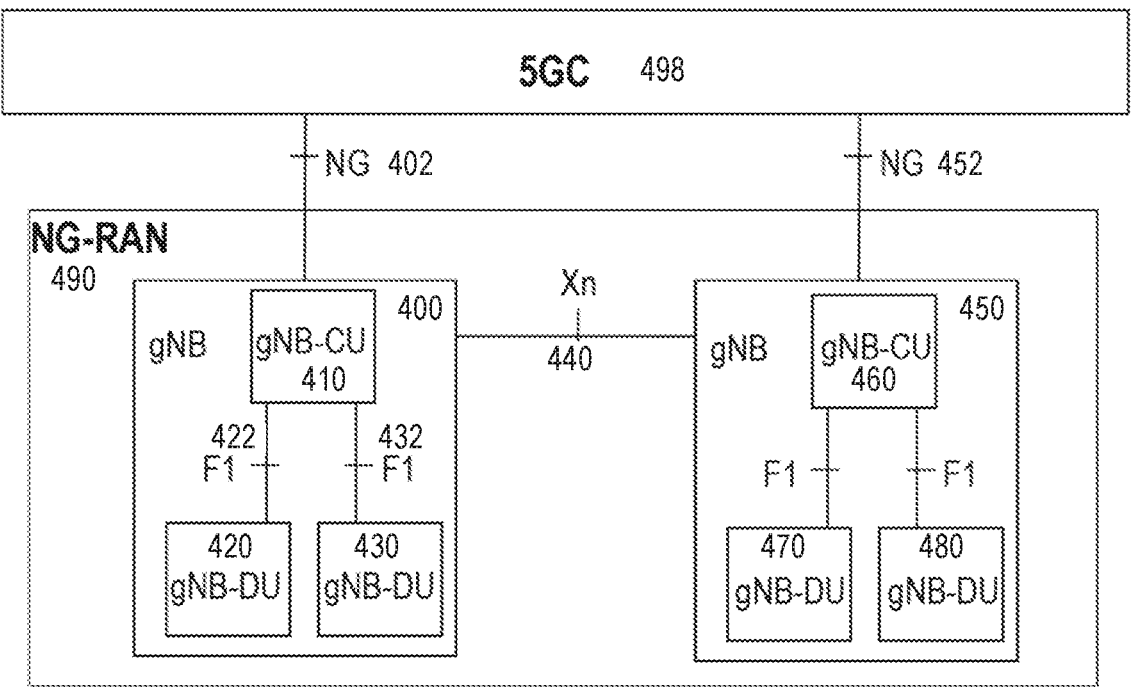
FIGS. 4A-B are block diagrams illustrating an exemplary 5G logical network architecture that is split and/or partitioned in various ways, according to various exemplary embodiments of the present disclosure.

Although the above discussion addresses NR functionality at a protocol and/or functional level, various NR network architectures have also been specified in 3GPP (see, e.g., 3GPP TR 38.801 v1.2.0). FIG. 4A illustrates a high-level view of the 5G network architecture, consisting of a Next Generation RAN (NG-RAN 490) and a 5G Core (5GC 498). NG-RAN 490 can include a set of gNodeB's (gNBs, e.g., 400 and 450) connected to the 5GC via one or more NG interfaces (e.g., 402 and 452), whereas the gNBs can be connected to each other via one or more Xn interfaces, such as Xn interface 450 between gNBs 400 and 450. With respect to the NR interface to UEs, each of the gNBs can support frequency division duplexing (FDD), time division duplexing (TDD), or a combination thereof.

NG-RAN 490 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for control plane (CP) and user plane (UP) data on TNL of NG-RAN interfaces is supported, NDS/IP (3GPP TS 38.401) shall be applied.

The NG RAN logical nodes shown in FIG. 4A (and described in 3GPP TS 38.401 and TR 38.801) include a central (or centralized) unit (CU or gNB-CU) and one or more distributed (or decentralized) units (DU or gNB-DU).

For example, gNB 400 in FIG. 4A includes gNB-CU 410 and gNB-DUs 420 and 430, while gNB 450 includes gNB-CU 460 and gNB-DUs 470 and 480. The respective CUs are logical nodes that can host higher-layer protocols and perform various gNB functions such controlling the operation of DUs. Similarly, each DU is a logical node that can host lower-layer protocols and can include, depending on the functional split, various subsets of the gNB functions. As such, each of the CUs and DUs can include various circuitry needed to perform their respective functions, including processing circuitry (e.g., processor(s) and memory), network interface and/or communication circuitry (e.g., transceivers), and power supply circuitry. Moreover, the terms "central unit" and "centralized unit" are used interchangeably herein, as are the terms "distributed unit" and "decentralized unit."

A gNB-CU connects to its associated gNB-DUs over respective F1 logical interfaces, such as interfaces 422 and 432 shown in FIG. 4A. The gNB-CU and connected gNB-DUs are only visible to other gNBs and the 5GC as a gNB, e.g., the F1 interface is not visible beyond gNB-CU. In the gNB split CU-DU architecture illustrated by FIG. 4A, DC can be achieved by allowing a UE to connect to multiple DUs served by the same CU or by allowing a UE to connect to multiple DUs served by different CUs.

Like LTE, NR supports carrier aggregation (CA), allowing a UE to utilize multiple carriers (e.g., CC1, etc.) or serving cells (e.g., PCell, SCells), as they are sometimes referred to. This increases the available bandwidth for the UE and, hence, the potential throughput. Perhaps even more critical in some cases, CA allows the UE to use scattered bandwidths. An operator may have access to several bandwidths, potentially in different frequency bands. With CA, these bandwidths can be aggregated for one UE even though they are separated in frequency.

Furthermore, the F1 interface between the gNB-CU and gNB-DU is specified, or based on, the following general principles:

F1 is an open interface;
F1 supports the exchange of signalling information between respective endpoints, as well as data transmission to the respective endpoints;
from a logical standpoint, F1 is a point-to-point interface between the endpoints (even in the absence of a physical direct connection between the endpoints);
F1 supports control plane (CP) and user plane (UP) separation, such that a gNB-CU may be separated in CP and UP;
F1 separates Radio Network Layer (RNL) and Transport Network Layer (TNL);
F1 enables exchange of user-equipment (UE) associated information and non-UE associated information;
F1 is defined to be future proof with respect to new requirements, services, and functions;
A gNB terminates X2, Xn, NG and S1-U interfaces.

As briefly mentioned above, a CU can host higher-layer protocols such as RRC and PDCP, while a DU can host lower-layer protocols such as RLC, MAC and PHY. Other variants of protocol distributions between CU and DU exist, such as hosting the RRC, PDCP and part of the RLC protocol in CU (e.g., Automatic Retransmission Request (ARQ) function), while hosting the remaining parts of the RLC protocol in the DU, together with MAC and PHY. Even so, for NR Rel-15, PDCP layer and above will be centralized and RLC-MAC-PHY layers will be decentralized. The F1 interface will be used for communication between the centralized and decentralized protocols.

Figure 4B:
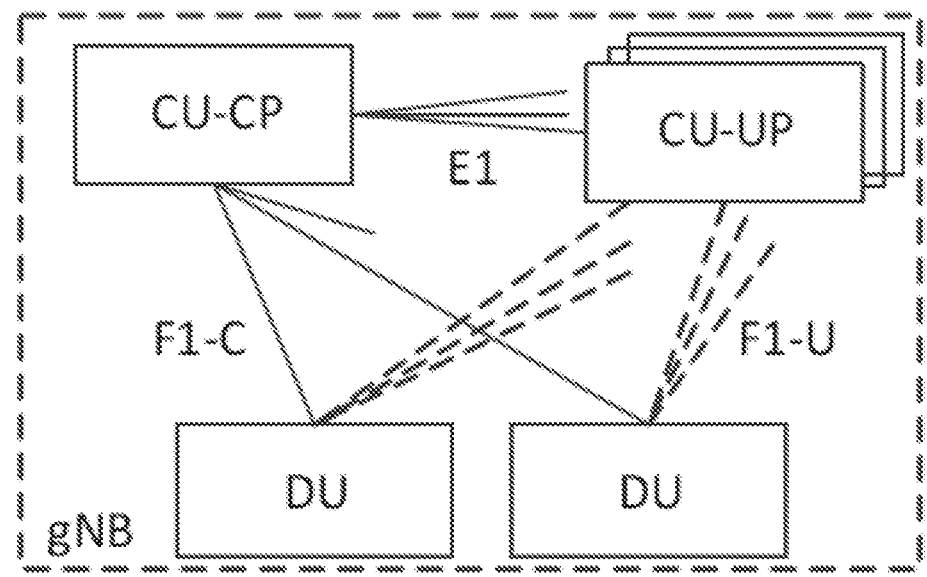

3GPP RAN WG3 has also stared working on a new open interface—referred to as "E1"—between the control plane (CU-CP) and the user plane (CU-UP) parts of CU. FIG. 4B is a block diagram illustrating logical interfaces between the control plane (CU-CP) and the user plane (CU-UP) parts of an NR CU. In addition to the new E1 interface, the F1 interface can be logically separated into CP (F1-C) and UP (F1-U) functionalities. The following scenarios for the split CU-UP/CP are defined in 3GPP TR 38.806:

CU-CP and CU-UP centralized;
    CU-CP distributed and CU-UP centralized; and
    CU-CP centralized and CU-UP distributed.

Even so, the standardization of standalone NR and NR-DC (also referred to as "NR-NR DC") is still ongoing in 3GPP, with the architecture for NR-DC not yet defined. For example, with respect to RRC termination, it has not been decided whether NR-DC will utilize a single, MN-terminated RRC (e.g., similar to LTE DC) or an RRC terminated at both MN and SN, utilizing a direct SRB between SN and UE (e.g., similar to EN-DC). Moreover, the combination of NR-DC with NR DU/CU split architecture is expected to create various difficulties and/or ambiguities. For example, an RRC connection with a particular UE is terminated in the CU. Currently, however, each CU can terminate only a single RRC connection with that particular UE. If the MN and SN DUs used for NR-DC are associated with the same CU, then it is not possible for these two DUs to provide master and secondary RRC connections, respectively, to the UE. However, if the MN and SN DUs are associated with different CUs, then dual RRC connections are possible. This limitation and/or inconsistency can prevent and/or inhibit the NR DU/CU split architecture from achieving various benefits and/or advantages that are associated with NR-DC, including but not limited to those described hereinabove.

Various exemplary embodiments are described herein as methods, procedures, and/or operations performed in relation to dual-connectivity (DC) involving two NR nodes (i.e., NR-DC) that employ a CU-DU architecture with a split at (or just below) the PDCP layer. These embodiments are used for the purpose of illustration only, without limitation. For example, principles of these embodiments are equally applicable to other configurations, scenarios, and/or network types included, but not limited to:

Multi-connectivity involving more than two NR nodes;
    Multi-connectivity involving multiple radio access technologies (RATs), e.g., MR-DC, including when a single DU supports multiple RATs; and
    CU-DU split at other points in the protocol stack, including:
        RRC in CU; PDCP, RLC, MAC, PHY, and RF in DU.
        RRC, PDCP and high RLC in CU; low RLC, MAC, PHY, and RF in DU.
        RRC, PDCP and RLC in CU; MAC, PHY, and RF in DU.
        Lower MAC (e.g., HARQ), PHY, and RF in DU; remainder in CU.
        PHY and RF in DU; remainder in CU.
        RF in DU and remainder in CU.

Figure 5:
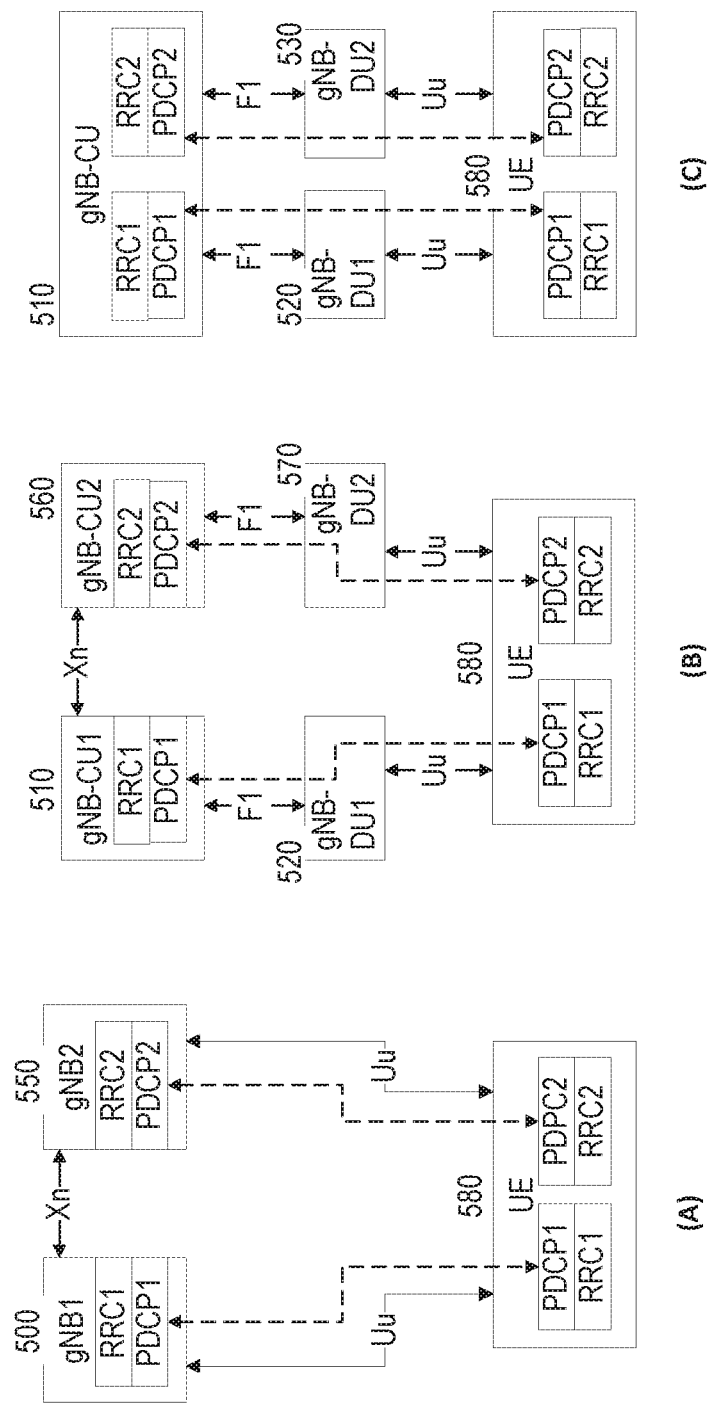
FIGS. 5A-C shows three different logical architectures that can be employed for dual RRC connections between one or more CUs and a UE, according to various exemplary embodiments of the present disclosure.

FIG. 5 shows three different logical architectures that can be employed for dual RRC connections between one or more CUs and a user equipment (UE), according to various exemplary embodiments of the present disclosure. As shown in FIG. 5, the dual RRC connections are referred to as "RRC1" and "RRC2", and each of these is associated with a corresponding PDCP connection, referred to respectively as "PDCP1" and "PDCP2". The description uses RRC1 and RRC2 to refer to the MN (or initial) RRC connection and SN (or additional) RRC connection, respectively, but this is merely for the purposes of explanation. Furthermore, this should not be confused with the designation of SRBs (e.g., SRB1-3) and PDCP entities. For example, it is possible to realize both SRB1 and SRB2 on RRC1, and in that case, there will be separate PDCP1 entities associated with SRB1 and SRB2.

Furthermore, the exemplary network architecture shown in FIG. 5 is similar to the one shown in FIG. 4A. As such, similar numerical labeling scheme is used for convenience and clarity. More specifically, FIG. 5 shows two gNBs (gNB1 500 and gNB2 550) connected via an Xn interface. The first gNB (i.e., gNB 500) includes a CU (shown as gNB-CU 510 or gNB1-CU 510) and two DUs (shown as gNB-DU1 520 and gNB-DU2 530). The second gNB (i.e., gNB1 550) includes a CU (shown as gNB2-CU 560) and at least one DU (shown as gNB-DU2 570). FIG. 5 also illustrates a UE 580 that utilizes the dual RRC connections.

FIG. 5A illustrates an exemplary logical architecture in which the CU-DU split configuration is not utilized. In this architecture, the UE's dual RRC connections are made to separate gNBs—RRC1 to gNB1 500, RRC2 to gNB2 500—via the Uu interface. The two gNBs communicate via the Xn interface, as described above.

FIGS. 5B-C illustrate two exemplary logical architectures that utilizes a CU-DU split configuration based on the CU-DU F1 interface. In both cases, the UE's dual RRC connections are carried via the Uu interface to separate gNB-DUs—RRC1 via gNB-DU1 520, RRC2 via gNB-DU2 570. In FIG. 5B, the two DUs are associated with separate CUs—gNB-CU1 510 and gNB-CU2 560—that are connected to each other via the Xn interface. Each of these CUs maintains one of the RRC connections with the UE. This scenario can be referred to as "inter-CU NR-DC." In FIG. 5C, the two gNB-DUs 520, 530 are associated with a single gNB-CU 510 that can, in various embodiments, maintain both RRC connections with the UE. This scenario can be referred to as "intra-CU NR-DC."

With respect to the two split CU-DU architectures shown in FIGS. 5B-C, initially the UE will be in single-connectivity mode with the primary RRC connection (e.g., RRC1) being carried via the Uu interface with gNB-DU1 520. When initiating NR-DC, the CU (e.g., gNB-CU1 510 in FIG. 5B, gNB-CU 510 in FIG. 5C) can configure the UE to perform appropriate measurements. When the UE sends a measurement report that fulfills the reporting condition, the CU can configure the UE for DC using a second DU (e.g., gNB-DU2 570 in FIG. 5B, gNB-DU2 530 in FIG. 5C).

In various exemplary embodiments of the present disclosure, if the CU determines that the second (or target) DU being considered for NR-DC is a DU associated with that CU (i.e., intra-CU NR-DC as shown in FIG. 5C), the CU can establish an additional RRC entity corresponding to a secondary RRC (e.g., RRC2 shown in FIG. 5). During the DC setup, the RRC2 entity in the CU sends the target DU (e.g., gNB-DU2) the information required to setup the DC using, e.g., the F1-AP UE context setup request message. This information communicated to the DU2 can include:

A portion of the UE radio capabilities that can be used by the DU2.
    The PSCell and optionally a list of SCells that can be used by the DU to setup Carrier Aggregation in the SCG radio leg. If needed, optionally the CU can send measurement results of the DU cells that were reported from the UE.

Measurement configurations that the CU wants to the Setup for the sake of the SCG, the information is used by the DU to configure the proper measurement gaps, if required; and Information about the DRBs/SRBs to be setup.

The target DU can respond to the CU with information such as:

The cell group configuration chosen for the SCG (e.g., lower layer configuration for PSCell and SCG-SCells); and The DRBs/SRBs that has been setup (and also those that were not setup)

During addition, change, or reconfiguration of the secondary DU (e.g., gNB-DU2), the UE may receive a downlink RRC message via RRC1 (hereinafter referred to as an "RRC1 message") that contains an embedded RRC2 message, which can be prepared by the CU on behalf of the secondary DU. The RRC2 message can contain the SCG configuration. Similarly, in the uplink, the UE may send to the CU an RRC1 message that contains an embedded RRC2 message. The CU can then internally forward this message to the RRC2 entity, e.g., between different software handlers, virtual RRC machines, and/or georedundant CU instances. For example, two virtual RRC machines in the same CU could be coordinated between each other and have joint success and failure handling, or they could be independent such that the outcome of an RRC1 procedure does not impact the outcome of an RRC2 procedure, and vice versa.

In various embodiments, when setting up DC, the CU(s) involved can decide whether or not to setup SRB3 (i.e., direct RRC connection between UE and SN) based on various factors including, e.g., if the two DUs involved in the DC are controlled by different CUs. In some embodiments, even when a single CU controls both DUs involved (e.g., intra-CU NR-DC shown in FIG. 5C), the CU can still decide to setup SRB3 if it is beneficial.

Likewise, in various embodiments, when setting up or reconfiguring DC, the CU(s) involved can decide whether or not to setup SCG split bearers (i.e., Split UP bearer, or DRB, from the SN) based on various factors including, e.g., if the two DUs involved in the DC are controlled by different CUs. In some embodiments, even when a single CU controls both DUs involved (e.g., intra-CU NR-DC shown in FIG. 5C), the CU can still decide to setup SCG split bearers if it is beneficial. Moreover, the CU's decision on whether to setup SCG split bearers can be made independently of a decision of whether or not to setup SRB3, and vice versa. For example, the CU can decide to setup split SRBs even if it controls both DUs involved, but setup split DRBs only if the two DUs are controlled by different CUs.

Likewise, in various embodiments, when setting up or reconfiguring DC, the CU(s) involved can decide whether or not to setup SCG bearers (i.e., UP bearer, or DRB, from the SN) based on various factors including, e.g., if the two DUs involved in the DC are controlled by different CUs. In some embodiments, even when a single CU controls both DUs involved (e.g., intra-CU NR-DC shown in FIG. 5C), the CU can still decide to setup SCG bearers if it is beneficial. Moreover, the CU's decision on whether to setup SCG bearers can be made independently of a decision of whether or not to setup SRB3 and/or SCG split bearers, and vice versa. For example, in case the CU decides not to setup SCG bearers when the two DUs are controlled by the same CU, that CU can independently decide to setup split bearers to make use of the SCells belonging to the second DU.

There is a security requirement in LTE/NR that prevents the association of the same security key with bearers terminated in different nodes. In the case of intra-CU DC, since the PDCP entities are terminated in one CU, the same key can be used for all bearers to be setup, whether they are MCG, SCG, or split bearers. However, this CU could also configure different keys for the different types of bearers. In one exemplary embodiment, the CU can generate the equivalent of the S-KgNB that is used in EN-DC, and associate that key with the bearers that are using DU2's SCells, which can be considered as SCG bearers.

Figure 18:
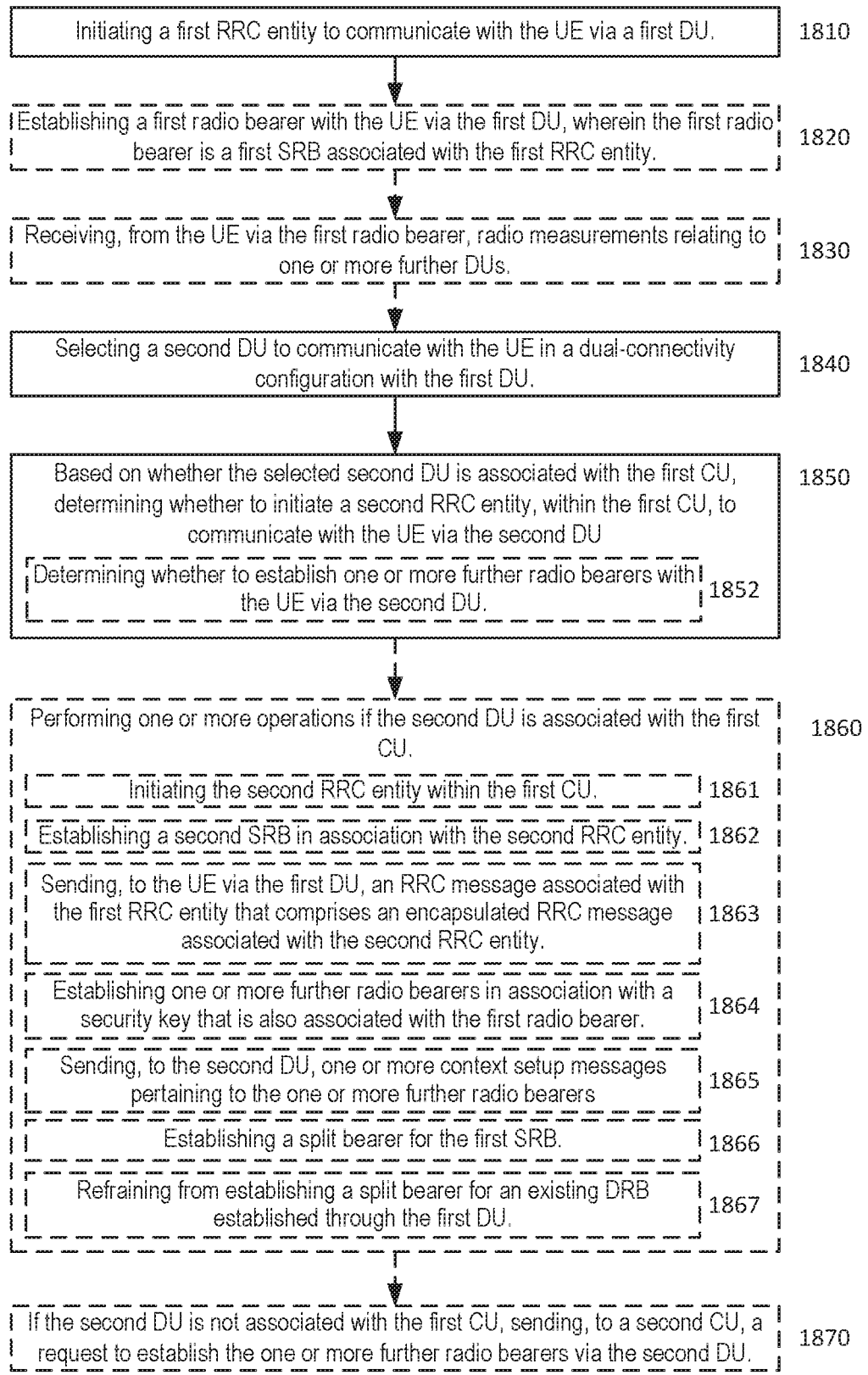
FIG. 18 is a flow diagram illustrating exemplary methods and/or procedures performed by a centralized unit (CU) of a base station (e.g., gNB), according to various exemplary embodiments of the present disclosure

FIG. 18 is a flow diagram illustrating an exemplary method and/or procedure for configuring a user equipment (UE) to communicate via a plurality of distributed units (DUs), according to various exemplary embodiments of the present disclosure. The exemplary method and/or procedure shown in FIG. 18 can be performed by a first centralized unit (CU) of a base station (e.g., gNB, en-gNB, eNB, ng-eNB, etc.) in a radio access network (RAN, e.g., NG-RAN, E-UTRAN, etc.). For example, the exemplary method and/or procedure can be performed by a CU shown in, or described in relation to, other figures herein. Furthermore, as explained below, the exemplary method and/or procedure shown in FIG. 18 can be utilized cooperatively with the exemplary method and/or procedures shown in FIG. 19 (described below) to provide various exemplary benefits described herein. In addition, although FIG. 18 shows blocks in a particular order, this order is merely exemplary, and the operations of the exemplary method and/or procedure can be performed in a different order than shown in FIG. 18 and can be combined and/or divided into blocks having different functionality. Optional operations are represented by dashed lines.

The exemplary method and/or procedure illustrated in FIG. 18 can include the operations of block 1810, in which the first CU can initiate a first Radio Resource Control (RRC) entity to communicate with the UE via a first DU. In some embodiments, the exemplary method and/or procedure can also include the operations of block 1820, where the first CU can establish a first radio bearer with the UE via the first DU. The first radio bearer can be a signaling radio bearer (SRB) associated with the first RRC entity.

In some embodiments, the exemplary method and/or procedure can also include the operations of block 1830, where the first CU can receive, from the UE via the first radio bearer, radio measurements relating to one or more further DUs. The exemplary method and/or procedure can also include the operations of block 1840, wherein the first CU can select a second DU to communicate with the UE in a dual-connectivity (DC) configuration together with the first DU. In some embodiments, the second DU can be selected from the one or more further DUs based on the radio measurements (e.g., received in block 1830). In some embodiments, the first DU and the second DU can be configured to utilize different radio access technologies for communicating with the UE.

The exemplary method and/or procedure can also include the operations of block 1850, wherein the first CU can, based on whether the selected second DU is associated with the first CU, determine whether to initiate a second RRC entity, within the first CU, to communicate with the UE via the second DU. In some embodiments, the operations of block 1850 can also include the operations of sub-block 1852, wherein the first CU can, based on whether the selected second DU is associated with the first CU, determine whether to establish one or more further radio bearers with the UE via the second DU.

In various embodiments, the one or more further radio bearers can include at least one of the following: a second SRB; a split bearer for the first SRB; a split bearer for an existing data radio bearer, DRB, established through the first DU; and one or more further DRBs.

In some embodiments, the one or more further radio bearers can include a first further radio bearer comprising one of the following: a second SRB, and a split bearer for the first SRB; and a second further radio bearer comprising one of the following: a split bearer for an existing data radio bearer (DRB) established through the first DU, and one or more further DRBs. In such embodiments, the determining operation of block 1850 can include two independent operations, i.e., determining whether to establish the first further radio bearer and determining whether to establish the second further radio bearer.

In some embodiments, the exemplary method and/or procedure can also include the operations of block 1860, wherein the first CU can perform one or more operations if the second DU is associated with the first CU, as determined in block 1850. In some embodiments, the operations in block 1860 can include sub-block 1861, wherein the first CU can initiate the second RRC entity within the first CU. In some embodiments, the operations in block 1860 can include sub-block 1862, wherein the first CU can establish a second SRB in association with the second RRC entity.

In some embodiments, the operations in block 1860 can include sub-block 1863, wherein the first CU can send, to the UE via the first DU, an RRC message associated with the first RRC entity that comprises an encapsulated RRC message associated with the second RRC entity. In some embodiments, the operations in block 1860 can include sub-block 1864, where the first CU can establish the one or more further radio bearers in association with a security key that is also associated with the first radio bearer.

In some embodiments, the operations in block 1860 can include sub-block 1865, where the first CU can send, to the second DU, one or more context setup messages pertaining to the one or more further radio bearers. In such embodiments, the one or more context setup message can include at least one of the following: one or more capabilities of the UE; a list of one or more cells that usable for carrier aggregation; at least a portion of the radio measurements; measurement configurations for use by the second DU; and information about the one or more further radio bearers.

In some embodiments, a first further radio bearer can be a split bearer for the first SRB, and a second further radio bearer can be a split bearer for an existing DRB established through the first DU. In such embodiments, the operations in block 1860 can include sub-block 1866, where the first CU can establish the split bearer for the first SRB, and sub-block 1867, where the first CU can refrain from establishing a split bearer for the existing DRB.

In some embodiments, the exemplary method and/or procedure can also include the operations of block 1870, wherein the first CU can, if the second DU is not associated with the first CU (e.g., as determined in block 1850), send a request to establish the one or more further radio bearers via the second DU. This request can be sent to a second CU via an Xn interface, such as described hereinabove.

Figure 19:
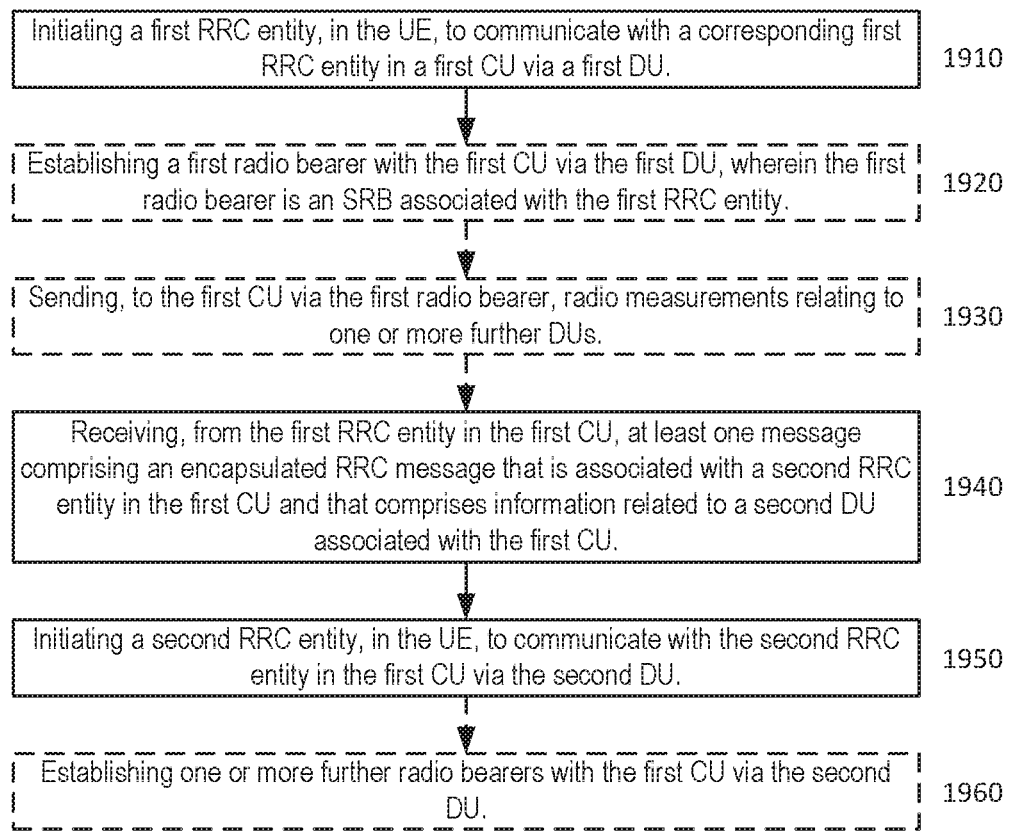
FIG. 19 is a flow diagram illustrating exemplary methods and/or procedures performed by a user equipment (UE) or wireless device, according to various exemplary embodiments of the present disclosure.

FIG. 19 is a flow diagram illustrating an exemplary method and/or procedure for a user equipment (UE) to communicate via a plurality of distributed units (DUs) in a radio access network (RAN), according to various exemplary embodiments of the present disclosure. The exemplary method and/or procedure shown in FIG. 19 can be performed a UE (e.g., wireless device, IoT device, modem, etc. or component thereof) operating in a RAN. For example, the exemplary method and/or procedure can be performed by a UE shown in, or described in relation to, other figures herein. Furthermore, as explained below, the exemplary method and/or procedure shown in FIG. 19 can be utilized cooperatively with the exemplary method and/or procedures shown in FIG. 18 (described above), to provide various exemplary benefits described herein. In addition, although FIG. 19 shows blocks in a particular order, this order is merely exemplary, and the operations of the exemplary method and/or procedure can be performed in a different order than shown in FIG. 19 and can be combined and/or divided into blocks having different functionality. Optional operations are represented by dashed lines.

The exemplary method and/or procedure illustrated in FIG. 19 can include the operations of block 1910, in which the UE can initiate a first Radio Resource Control (RRC) entity to communicate with a corresponding first RRC entity in a first centralized unit (CU) via a first distributed unit (DU). For example, the first DU can be associated with the first CU. In some embodiments, the exemplary method and/or procedure can also include the operations of block 1920, in which the UE can establish a first radio bearer with the first CU via the first DU. The first radio bearer can be a first signaling radio bearer (SRB) associated with the first RRC entity. In some embodiments, the exemplary method and/or procedure can also include the operations of block 1930, in which the UE can send, to the first CU via the first radio bearer, radio measurements relating to one or more further DUs.

The exemplary method and/or procedure can also include the operations of block 1940, wherein the UE can receive, from the first RRC entity in the first CU, at least one message comprising an encapsulated RRC message that is associated with a second RRC entity in the first CU. The encapsulated RRC message can also include information related to a second DU associated with the first CU. In some embodiments, the second DU can be one of the further DUs for which the UE sent radio measurements (e.g., in block 1930). In some embodiments, the first DU and the second DU can utilize different radio access technologies for communicating with the UE, and vice versa.

The exemplary method and/or procedure can also include the operations of block 1950, wherein the UE can initiate second RRC entity, in the UE, to communicate with the second RRC entity in the first CU via the second DU. In some embodiments, the exemplary method and/or procedure can also include the operations of block 1960, wherein the UE can establish one or more further radio bearers with the first CU via the second DU. In various embodiments, the one or more further radio bearers can include at least one of the following: a second SRB; a split bearer for the first SRB; a split bearer for an existing data radio bearer (DRB) established through the first DU; and one or more further DRBs.

In some embodiments, the one or more further radio bearers can include a second SRB. In such embodiments, the second RRC entity in the UE can communicate with the second RRC entity in the CU via the second SRB. In some embodiments, the one or more further radio bearers can be established (e.g., in operation 1960) in association with a security key that is also associated with the first radio bearer.

Figure 6:
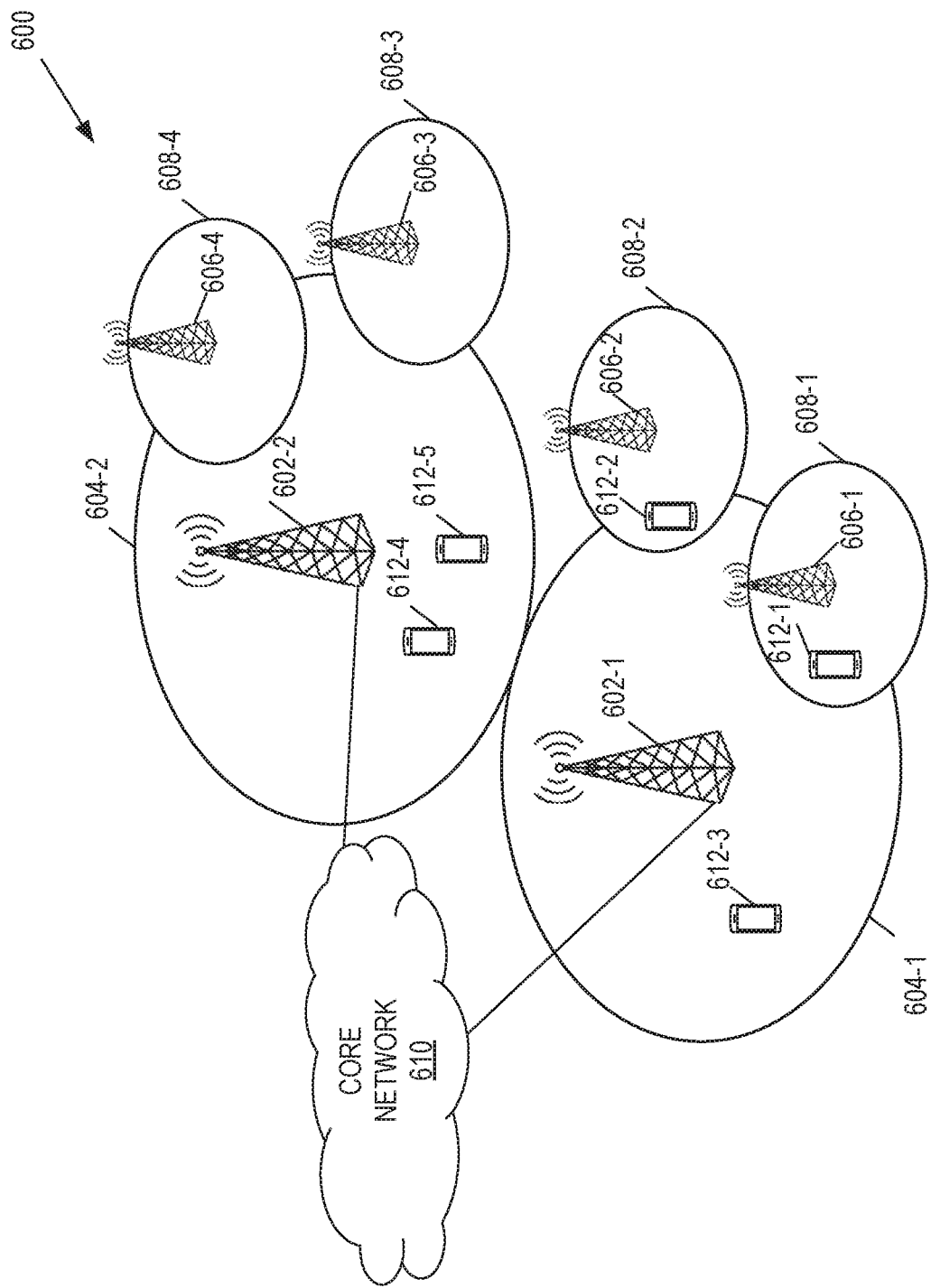
FIGS. 6-8 are block diagrams of exemplary communications systems and/or networks configurable according to various exemplary embodiments of the present disclosure.

FIG. 6 illustrates one example of a cellular communications system and/or network, comprising various devices and/or systems usable to implement any of the exemplary methods described above. In the embodiments described herein, the cellular communications network 600 is a 5G NR network. In this example, the cellular communications network 600 includes base stations 602-1 and 602-2, which in LTE are referred to as eNBs and in 5G NR are referred to as gNBs, controlling corresponding macro cells 604-1 and 604-2. The base stations 602-1 and 602-2 are generally referred to herein collectively as base stations 602 and individually as base station 602. Likewise, the macro cells 604-1 and 604-2 are generally referred to herein collectively as macro cells 604 and individually as macro cell 604. The cellular communications network 600 also includes a number of low power nodes 606-1 through 606-4 controlling corresponding small cells 608-1 through 608-4. The low power nodes 606-1 through 606-4 can be small base stations (such as pico or femto base stations) or Remote Radio Heads (RRHs), or the like. Notably, while not illustrated, one or more of the small cells 608-1 through 608-4 may alternatively be provided by the base stations 602. The low power nodes 606-1 through 606-4 are generally referred to herein collectively as low power nodes 606 and individually as low power node 606. Likewise, the small cells 608-1 through 608-4 are generally referred to herein collectively as small cells 608 and individually as small cell 608. The base stations 602 (and optionally the low power nodes 606) are connected to a core network 660.

The base stations 602 and the low power nodes 606 provide service to wireless devices 612-1 through 612-5 in the corresponding cells 604 and 608. The wireless devices 612-1 through 612-5 are generally referred to herein collectively as wireless devices 612 and individually as wireless device 612. The wireless devices 612 are also sometimes referred to herein as UEs. Wireless devices 612 can take on various forms, including those compatible with MTC and/or NB-IoT.

Figure 7:
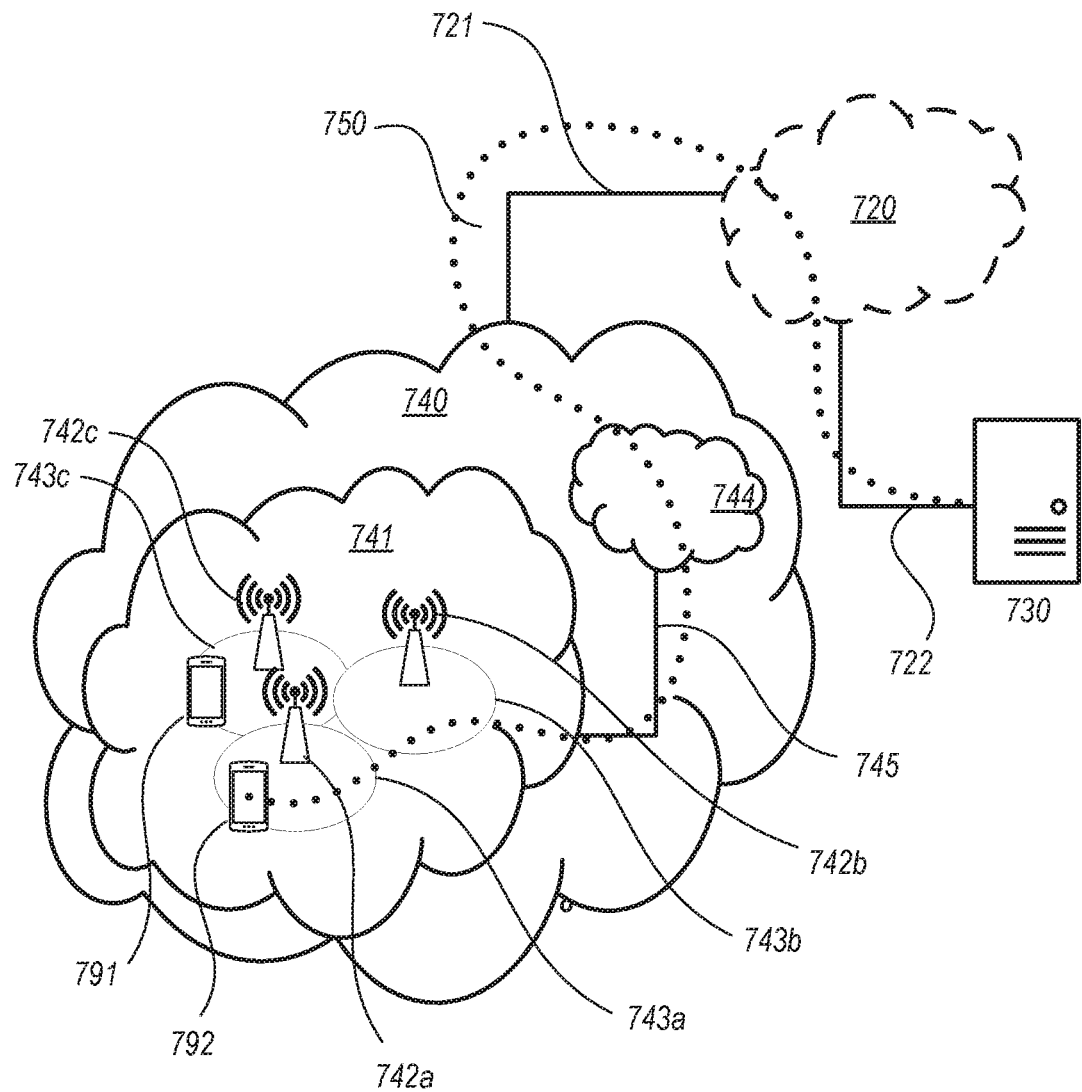

FIG. 7 shows another exemplary communication system and/or network in accordance with various embodiments of the present disclosure. The system includes a telecommunication network 740, such as a 3GPP-type cellular network, which comprises an access network 741, such as an gNB-RAN, and a core network 744 (e.g., 5GC). The access network 741 comprises a plurality of base stations 742a, 742b, 742c, such as gNBs or other types of wireless access points, each defining a corresponding coverage area 743a, 743b, 743c. Each base station 742a, 742b, 742c is connectable to the core network 744 over a wired or wireless connection 745. A first user equipment (UE) 791 located in coverage area 743c is configured to wirelessly connect to, or be paged by, the corresponding base station 742c. A second UE 792 in coverage area 743a is wirelessly connectable to the corresponding base station 742a. While a plurality of UEs 791, 792 are illustrated in this example, the disclosed embodiments are equally applicable to a situation where a sole UE is in the coverage area or where a sole UE is connecting to the corresponding base station 742.

The telecommunication network 740 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. The connections 721, 722 between the telecommunication network 740 and the host computer 730 may extend directly from the core network 744 to the host computer 730 or may go via an optional intermediate network 720. The intermediate network 720 may be one of, or a combination of more than one of, a public, private or hosted network; the intermediate network 720, if any, may be a backbone network or the Internet; in particular, the intermediate network 720 may comprise two or more subnetworks (not shown).

The communication system of FIG. 7B as a whole enables connectivity between one of the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 741, the core network 744, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, a base station 742 may not or need not be informed about the past routing of an incoming downlink communication with data originating from a host computer 730 to be forwarded (e.g., handed over) to a connected UE 791. Similarly, the base station 742 need not be aware of the future routing of an outgoing uplink communication originating from the UE 791 towards the host computer 730.

Example implementations, in accordance with an embodiment, of the UE, base station, and host computer discussed herein can also be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as a UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least wireless connection 870 with the UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

Figure 8:
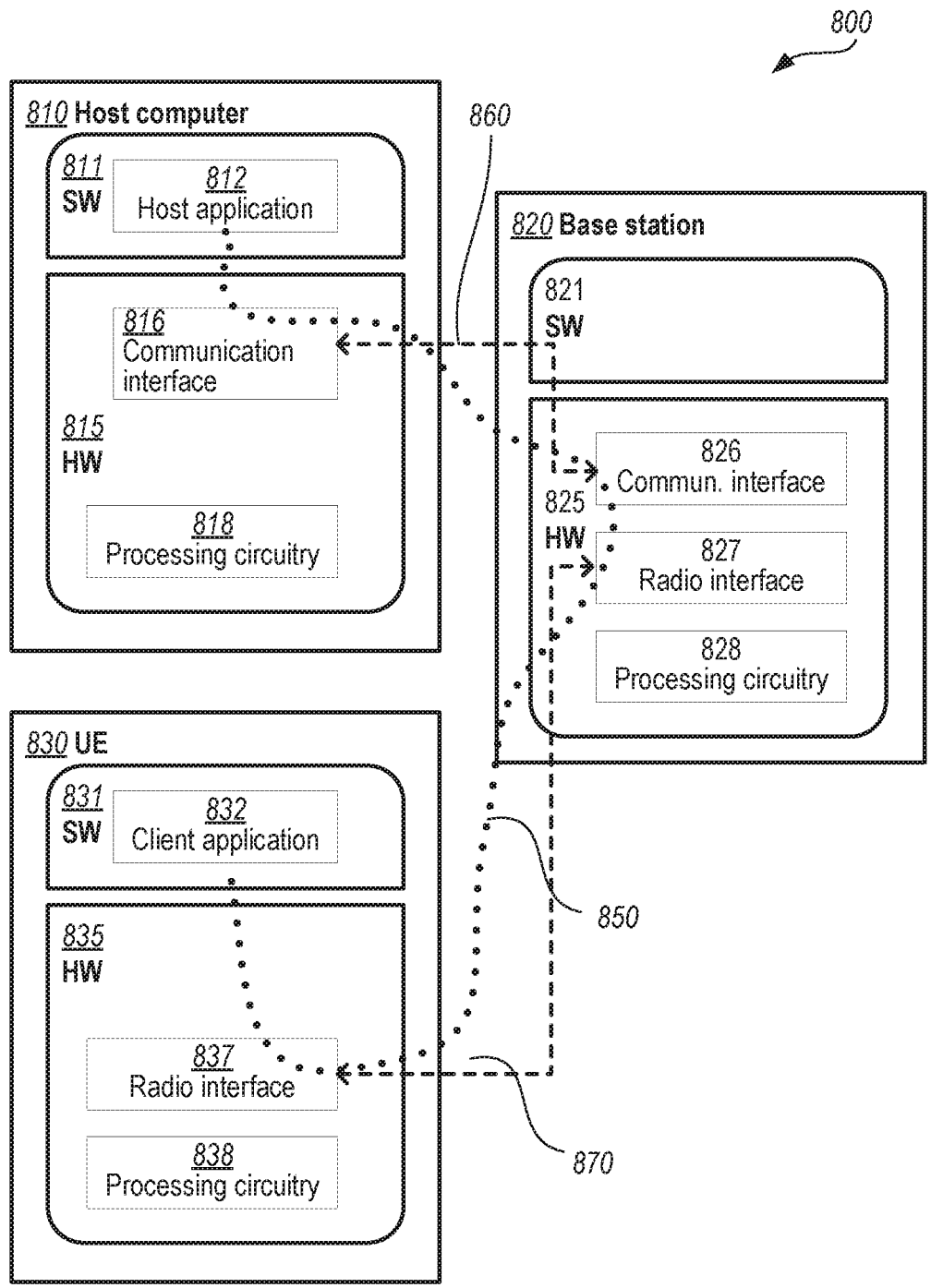

It is noted that the host computer 810, base station 820 and UE 830 illustrated in FIG. 8 may be identical to the host computer 730, one of the base stations 712*a*, 712*b*, 712*c* and one of the UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the use equipment 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further make decisions by which it dynamically changes the routing (e.g., on the basis of load balancing consideration or reconfiguration of the network).

The wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. For example, embodiments can facilitate unified and consistent UE behavior for handling dual RRC instances, regardless of where the two RRC instances are terminated in the network. Consequently, this specific improvement reduces implementation and testing effort required for UEs, which facilitates earlier market introduction of dual-RRC support. The ability to use two RRC instances improves the performance of dual connectivity (DC), which can result in better and/or more consistent throughput, and/or reduced delays, for users of the RAN.

A measurement procedure may be provided for the purpose of monitoring data rate, latency and other factors on which the one or more embodiments improve. There may further be an optional network functionality for reconfiguring the OTT connection 850 between the host computer 810 and UE 830, in response to variations in the measurement results. The measurement procedure and/or the network functionality for reconfiguring the OTT connection 850 may be implemented in the software 811 of the host computer 810 or in the software 831 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which software 811, 831 may compute or estimate the monitored quantities. The reconfiguring of the OTT connection 850 may include message format, retransmission settings, preferred routing, etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer's 810 measurements of throughput, propagation times, latency and the like. The measurements may be implemented in that the software 811, 831 causes messages to be transmitted, in particular empty or 'dummy' messages, using the OTT connection 850 while it monitors propagation times, errors etc.

Figures 9, 10:
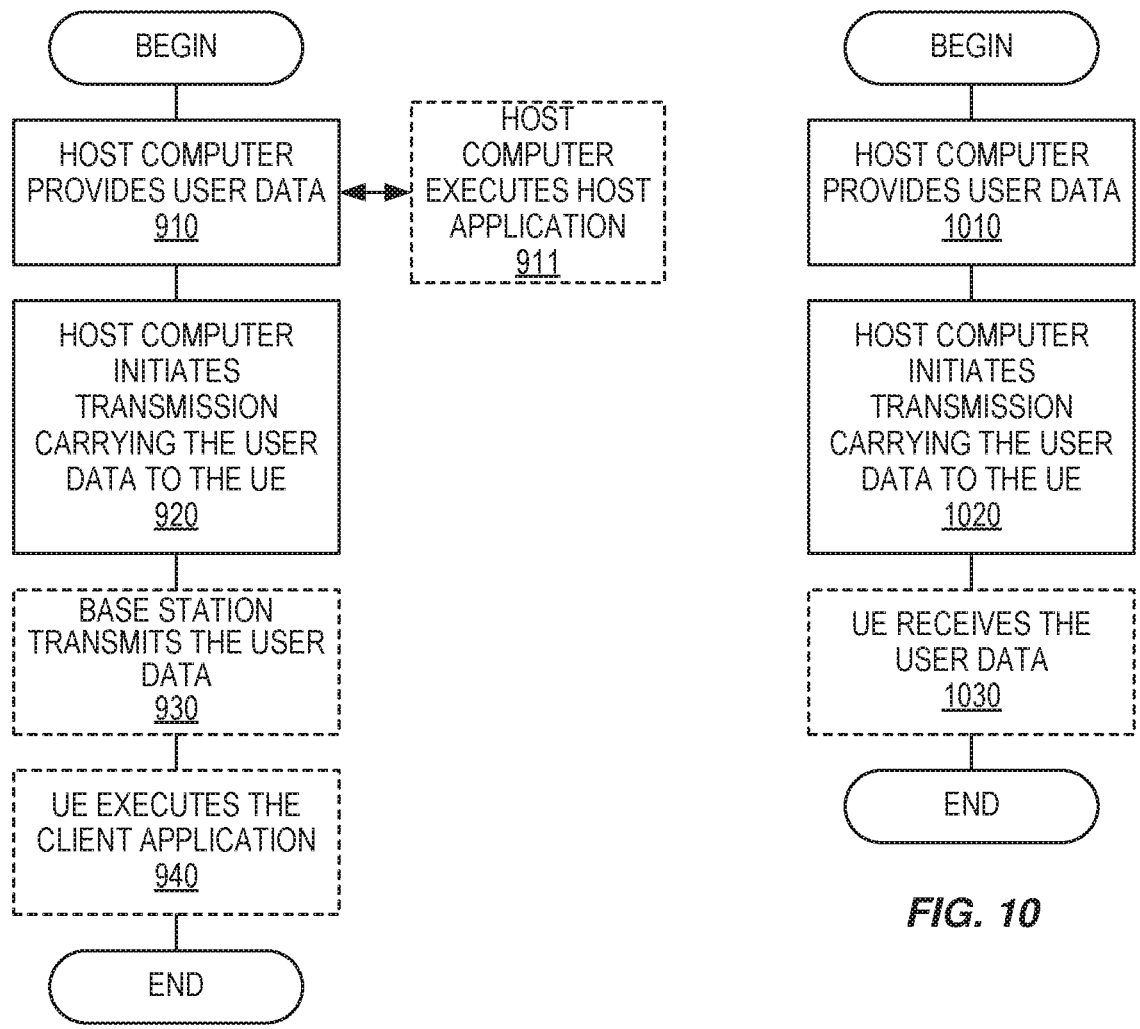
FIG. 9-12 are flow diagrams illustrating various exemplary methods and/or procedures implemented in a communication system, according to various exemplary embodiments of the present disclosure.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In a first step 910 of the method, the host computer provides user data. In an optional substep 911 of the first step 910, the host computer provides the user data by executing a host application. In a second step 920, the host computer initiates a transmission carrying the user data to the UE. In an optional third step 930, the base station transmits to the UE the user data which was carried in the transmission that the host computer initiated, in accordance with the teachings of the embodiments described throughout this disclosure. In an optional fourth step 940, the UE executes a client application associated with the host application executed by the host computer.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In a first step 1010 of the method, the host computer provides user data. In an optional substep (not shown), the host computer provides the user data by executing a host application. In a second step 1020, the host computer initiates a transmission carrying the user data to the UE. The transmission may pass via the base station, in accordance with the teachings of the embodiments described throughout this disclosure. In an optional third step 1030, the UE receives the user data carried in the transmission.

Figures 11, 12:
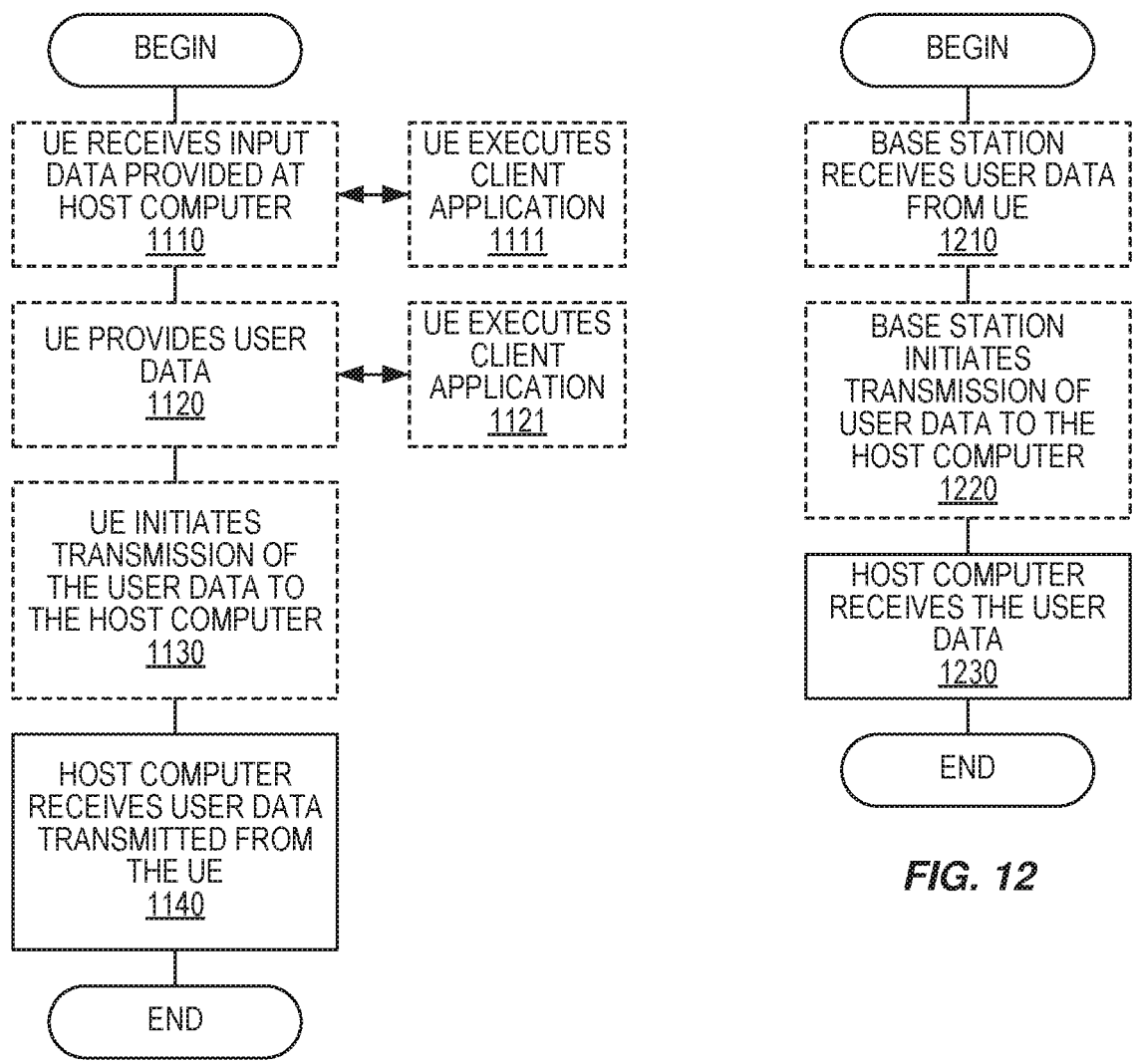

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In an optional first step 1110 of the method, the UE receives input data provided by the host computer. Additionally or alternatively, in an optional second step 1120, the UE provides user data. In an optional substep 1121 of the second step 1120, the UE provides the user data by executing a client application. In a further optional substep 1111 of the first step 1110, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1130, transmission of the user data to the host computer. In a fourth step 1140 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In an optional first step 1210 of the method, in accordance with the teachings of the embodiments described throughout this disclosure, the base station receives user data from the UE. In an optional second step 1220, the base station initiates transmission of the received user data to the host computer. In a third step 1230, the host computer receives the user data carried in the transmission initiated by the base station.

Figure 13:
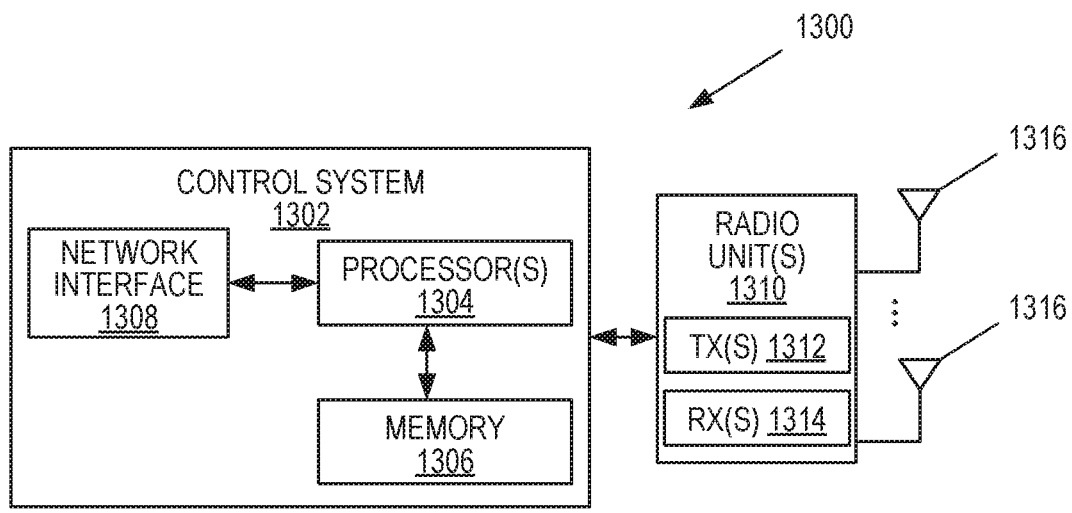
FIGS. 13-15 are block diagrams of exemplary radio access nodes configurable in various ways according to various exemplary embodiments of the present disclosure.

FIG. 13 is a schematic block diagram of a radio access node 1300 according to some embodiments of the present disclosure. The radio access node 1300 may be, for example, a base station 102 or 106. As illustrated, the radio access node 1300 includes a control system 1302 that includes one or more processors 1304 (e.g., Central Processing Units (CPUs), Application Specific Integrated Circuits (ASICs), Field Programmable Gate Arrays (FPGAs), and/or the like), memory 1306, and a network interface 1308. In addition, the radio access node 1300 includes one or more radio units 1310 that each includes one or more transmitters 1312 and one or more receivers 1314 coupled to one or more antennas 1316. In some embodiments, the radio unit(s) 1310 is external to the control system 1302 and connected to the control system 1302 via, e.g., a wired connection (e.g., an optical cable). However, in some other embodiments, the radio unit(s) 1310 and potentially the antenna(s) 1316 are integrated together with the control system 1302. The one or more processors 1304 operate to provide one or more functions of a radio access node 1300 as described herein. In some embodiments, the function(s) are implemented in software that is stored, e.g., in the memory 1306 and executed by the one or more processors 1304.

Figure 14:
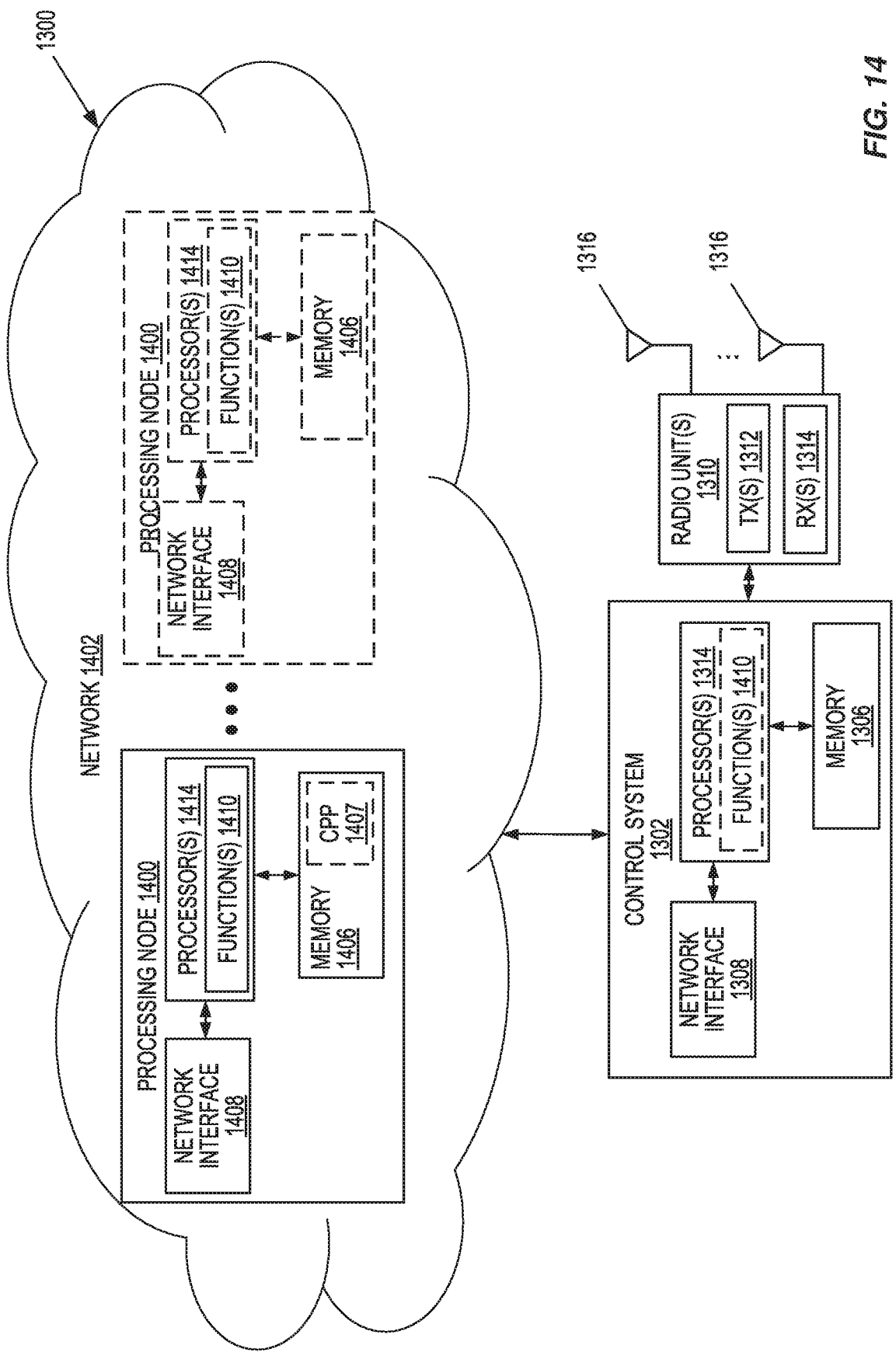

FIG. 14 is a schematic block diagram that illustrates a virtualized embodiment of the radio access node 1300 according to some embodiments of the present disclosure. This discussion is equally applicable to other types of network nodes. Further, other types of network nodes may have similar virtualized architectures.

As used herein, a "virtualized" radio access node is an implementation of the radio access node 1300 in which at least a portion of the functionality of the radio access node 1300 is implemented as a virtual component(s) (e.g., via a virtual machine(s) executing on a physical processing node(s) in a network(s)). As illustrated, in this example, the radio access node 1300 includes the control system 1302 that includes the one or more processors 1304 (e.g., CPUs, ASICs, FPGAs, and/or the like), the memory 1306, and the network interface 1308 and the one or more radio units 1310 that each includes the one or more transmitters 1312 and the one or more receivers 1314 coupled to the one or more antennas 1316, as described above. The control system 1302 is connected to the radio unit(s) 1310 via, for example, an optical cable or the like. The control system 1302 is connected to one or more processing nodes 1400 coupled to or included as part of a network(s) 1402 via the network interface 1308. Each processing node 1400 includes one or more processors 1414 (e.g., CPUs, ASICs, FPGAs, and/or the like), memory 1406, and a network interface 1408.

In this example, functions 1410 of the radio access node 1300 described herein are implemented at the one or more processing nodes 1400 or distributed across the control system 1302 and the one or more processing nodes 1400 in any desired manner. In some particular embodiments, some or all of the functions 1410 of the radio access node 1300 described herein are implemented as virtual components executed by one or more virtual machines implemented in a virtual environment(s) hosted by the processing node(s) 1400. As will be appreciated by one of ordinary skill in the art, additional signaling or communication between the processing node(s) 1400 and the control system 1302 is used in order to carry out at least some of the desired functions 1410. Notably, in some embodiments, the control system 1302 may not be included, in which case the radio unit(s) 1310 communicate directly with the processing node(s) 1400 via an appropriate network interface(s).

In some embodiments, the memory 1406 can contain a computer program product (CPP) 1407 including instructions which, when executed by at least one processor, causes the at least one processor to carry out the functionality of radio access node 1300 or a node (e.g., a processing node 1400) implementing one or more of the functions 1410 of the radio access node 1300 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
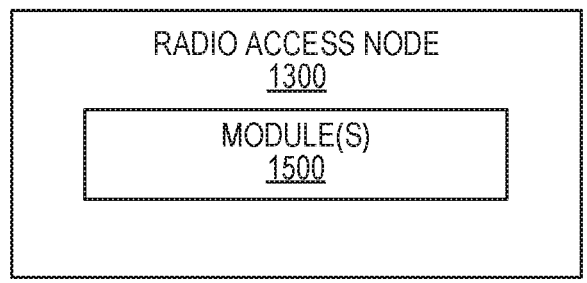

FIG. 15 is a schematic block diagram of the radio access node 1300 according to some other embodiments of the present disclosure. The radio access node 1300 includes one or more modules 500, each of which is implemented in software. The module(s) 500 provide the functionality of the radio access node 1300 described herein. This discussion is equally applicable to the processing node 1400 of FIG. 14 where the modules 500 may be implemented at one of the processing nodes 1400 or distributed across multiple processing nodes 1400 and/or distributed across the processing node(s) 1400 and the control system 1302.

Figure 16:
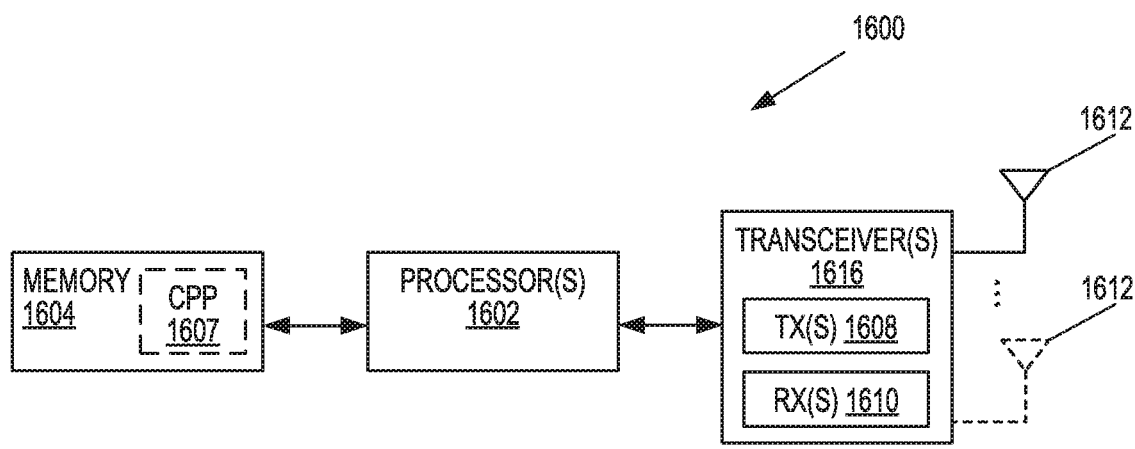
FIGS. 16-17 are block diagrams of exemplary wireless devices or UEs configurable in various ways, according to various exemplary embodiments of the present disclosure.

FIG. 16 is a schematic block diagram of a UE 1600 according to some embodiments of the present disclosure. As illustrated, the UE 1600 includes one or more processors 1602 (e.g., CPUs, ASICs, FPGAs, and/or the like), memory 1604, and one or more transceivers 1606 each including one or more transmitters 1608 and one or more receivers 1610 coupled to one or more antennas 1612. In some embodiments, the functionality of the UE 1600 described above may be fully or partially implemented in software that is, e.g., stored in the memory 1604 and executed by the processor(s) 1602.

In some embodiments, the memory 1604 can contain a computer program product (CPP) 1607 including instructions which, when executed by at least one processor, causes the at least one processor to carry out the functionality of the UE 1600 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
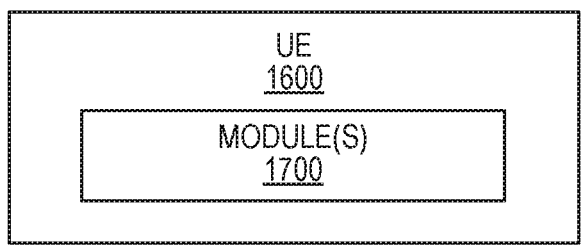

FIG. 17 is a schematic block diagram of the UE 1600 according to some other embodiments of the present disclosure. The UE 1600 includes one or more modules 1500, each of which is implemented in software. The module(s) 1500 provide the functionality of the UE 1600 described hereinabove.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Example embodiments of the techniques and apparatus described herein include, but are not limited to, the following enumerated examples:

1. A method, performed by a centralized unit (CU) in a radio access network (RAN), for configuring a user equipment (UE) to communicate via a plurality of distributed units (DUs), the method comprising:
   receiving from the UE, via a first radio bearer established through a first DU that is associated with the CU, radio measurements relating to one or more further DUs;
   based on the radio measurements, selecting a second DU, of the one or more further DUs, to communicate with the UE;
   based on whether the selected second DU is associated with the CU, determining whether to establish one or more further radio bearers with the UE via the second DU.

2. The method of embodiment 1, wherein:
   the first radio bearer comprises a signaling radio bearer (SRB) associated with a first Radio Resource Control (RRC) entity within the CU; and
   the one or more further radio bearers comprises at least one of the following:
   a second SRB;
   a split bearer for the first SRB;
   a split bearer for an existing data radio bearer (DRB) established through the first DU; and
   one or more further DRBs.

3. The method of any of embodiments 1-2, further comprising, if the second DU is not associated with the CU, sending, to a further CU via an Xn interface, a request to establish the one or more further radio bearers via the second DU.

4. The method of any of embodiments 1-2, further comprising, if the second DU is associated with the CU, initiating a second RRC entity within the CU.

5. The method of embodiment 4, further comprising, if the second DU is associated with the CU, establishing the second SRB in association with the second RRC entity.

6. The method of embodiment 4, further comprising sending, to the UE via the first DU, an RRC message associated with the first RRC entity that comprises an encapsulated RRC message associated with the second RRC entity.

7. The method of embodiment 2, further comprising, if the second DU is associated with the CU:
   establishing the split bearer for the first SRB; and
   refraining from establishing the split bearer for the existing DRB established through the first DU.

8. The method of any of embodiments 1-2, wherein:
   the one or more further radio bearers comprises:
      a first further radio bearer comprising one of: the second SRB, and the split bearer for the first SRB; and
      a second further radio bearer comprising one of: the split bearer for the existing DRB, and one or more further DRBs; and
   determining whether to establish the first further radio bearer is performed independently of determining whether to establish the second further radio bearer.

9. The method of any of embodiments 1-2, further comprising, if the second DU is associated with the CU, establishing the one or more further radio bearers in association with a security key that is also associated with the first radio bearer.

10. The method of any of embodiments 1-2, further comprising, if the second DU is associated with the CU, sending, to the second DU, one or more context setup messages pertaining to the one or more further radio bearers.

11. The method of embodiment 10, wherein the one or more context setup messages comprise at least one of the following:
   one or more capabilities of the UE;
   a list of one or more cells that usable for Carrier Aggregation (CA);
   at least a portion of the radio measurements;
   measurement configurations for use by the second DU; and
   information about the one or more radio bearers.

12. The method of any of embodiments 1-11, wherein the first DU and the second DU are configured to utilize different radio access technologies for communicating with the UE.

13. A method for a user equipment (UE) to communicate via a plurality of distributed units (DUs) in a radio access network (RAN), the method comprising:
   sending to a centralized unit (CU), via a first radio bearer established through a first distributed unit (DU) associated with the CU, radio measurements relating to one or more further DUs;
   receiving, from a first Radio Resource Control (RRC) entity within the CU, at least one RRC message associated with the first RRC entity that comprises an encapsulated RRC message associated with a second RRC entity within the CU, the encapsulated RRC message comprising information related to a second DU associated with the CU; and establishing one or more further radio bearers with the CU via the second DU.
14. The method of embodiment 13, wherein:
the first radio bearer comprises a signaling radio bearer (SRB) associated with the first RRC entity; and
the one or more further radio bearers comprises at least one of the following:
a second SRB;
a split bearer for the first SRB;
a split bearer for an existing data radio bearer (DRB) established through the first DU; and
one or more further DRBs.
15. The method of embodiment 14, wherein establishing the one or more further radio bearers comprises establishing the second SRB, and further comprising initiating a second RRC entity within the UE to communicate with the second RRC entity within the CU via the second SRB.
16. The method of any of embodiments 13-15, further comprising, establishing the one or more further radio bearers in association with a security key that is also associated with the first radio bearer.
17. A wireless device configurable to communicate via a plurality of distributed units (DUs) in a radio access network (RAN), the wireless device comprising:
processing circuitry configured to perform any of the steps of any of embodiments 13-16; and
power supply circuitry configured to supply power to the wireless device.
18. A centralized unit (CU) in a radio access network (RAN) arranged to configure a user equipment (UE) to communicate via a plurality of distributed units (DUs), the CU comprising:
processing circuitry configured to perform any of the steps of any of embodiments 1-12; and
power supply circuitry configured to supply power to the base station.
19. A user equipment (UE) configurable to communicate via a plurality of distributed units (DUs) in a radio access network (RAN), the UE comprising:
an antenna configured to send and receive wireless signals;
radio front-end circuitry operably coupled to the antenna;
processing circuitry operably coupled to the radio front-end circuitry and configured to perform any of the steps of any of embodiments 13-16;
an input interface connected to the processing circuitry and configured to allow input of information to be processed by the processing circuitry;
an output interface connected to the processing circuitry and configured to output information that has been processed by the processing circuitry; and
a battery connected to the processing circuitry and configured to supply power to the UE.
20. A communication system including a host computer comprising:
processing circuitry configured to provide user data; and
a communication interface configured to forward the user data to a cellular network for transmission to a user equipment (UE), wherein the cellular network comprises a base station having a radio interface and processing circuitry, the base station's processing circuitry configured to perform any of the operations comprising embodiments 1-12.
21. The communication system of the previous embodiment further including the base station.
22. The communication system of the previous two embodiments, further including the UE, wherein the UE is configured to perform operations corresponding to any of embodiments 13-16.
23. The communication system of the previous three embodiments, wherein:
the processing circuitry of the host computer is configured to execute a host application, thereby providing the user data; and
the UE comprises processing circuitry configured to execute a client application associated with the host application.
24. A method implemented in a communication system including a host computer, a base station, and a User Equipment (UE), the method comprising:
at the host computer, providing user data; and
at the host computer, initiating a transmission carrying the user data to the UE via a cellular network comprising the base station, wherein the base station performs any of the operations comprising any of embodiments 1-12.
25. The method of the previous embodiment, further comprising, at the base station, transmitting the user data.
26. The method of the previous two embodiments, wherein the user data is provided at the host computer by executing a host application, the method further comprising, at the UE, executing a client application associated with the host application.
27. A User Equipment (UE) configured to communicate with a base station, the UE comprising a radio interface and processing circuitry configured to perform any of the methods of the previous three embodiments.
28. A communication system including a host computer comprising:
processing circuitry configured to provide user data; and
a communication interface configured to forward user data to a cellular network for transmission to a User Equipment (UE), wherein the UE comprises a radio interface and processing circuitry, operably coupled and configured to perform any of the operations of any of embodiments 13-16.
29. The communication system of the previous embodiment, wherein the cellular network further includes a base station configured to communicate with the UE.
30. The communication system of the previous two embodiments, wherein:
the processing circuitry of the host computer is configured to execute a host application, thereby providing the user data; and
the UE's processing circuitry is configured to execute a client application associated with the host application.
31. A method implemented in a communication system including a host computer, a base station, and a User equipment (UE) the method comprising:
at the host computer, providing user data; and
at the host computer, initiating a transmission carrying the user data to the UE via a cellular network comprising the base station, wherein the UE performs any of the steps of any of embodiments 13-16.
32. The method of the previous embodiment, further comprising at the UE, receiving the user data from the base station.
33. A communication system including a host computer comprising:
communication interface configured to receive user data originating from a transmission from a User equipment (UE) to a base station;

wherein the UE comprises a radio interface and processing circuitry, the UE's processing circuitry configured to perform any of the operations of any of embodiments 13-16.

34. The communication system of the previous embodiment, further including the UE.

35. The communication system of the previous two embodiments, further including the base station, wherein the base station comprises a radio interface configured to communicate with the UE and a communication interface configured to forward to the host computer the user data carried by a transmission from the UE to the base station.

36. The communication system of the previous three embodiments, wherein:
the processing circuitry of the host computer is configured to execute a host application; and
the UE's processing circuitry is configured to execute a client application associated with the host application, thereby providing the user data.

37. The communication system of the previous four embodiments, wherein:
the processing circuitry of the host computer is configured to execute a host application, thereby providing request data; and
the UE's processing circuitry is configured to execute a client application associated with the host application, thereby providing the user data in response to the request data.

38. A method implemented in a communication system including a host computer, a base station, and a User equipment (UE) the method comprising:
at the host computer, receiving user data transmitted to the base station from the UE, wherein the UE performs any of the operations of any of embodiments 13-16.

39. The method of the previous embodiment, further comprising, at the UE, providing the user data to the base station.

40. The method of the previous two embodiments, further comprising:
at the UE, executing a client application, thereby providing the user data to be transmitted; and
at the host computer, executing a host application associated with the client application.

41. The method of the previous three embodiments, further comprising:
at the UE, executing a client application; and
at the UE, receiving input data to the client application, the input data being provided at the host computer by executing a host application associated with the client application;
wherein the user data to be transmitted is provided by the client application in response to the input data.

42. A communication system including a host computer comprising a communication interface configured to receive user data originating from a transmission from a User equipment (UE) to a base station, wherein the base station comprises a radio interface and processing circuitry, the base station's processing circuitry is configured to perform operations of any of embodiments 1-12.

43. The communication system of the previous embodiment further including the base station.

44. The communication system of the previous two embodiments, further including the UE, wherein the UE is configured to communicate with the base station.

45. The communication system of the previous three embodiments, wherein:
the processing circuitry of the host computer is configured to execute a host application; and
the UE is configured to execute a client application associated with the host application, thereby providing the user data to be received by the host computer.

46. A method implemented in a communication system including a host computer, a base station, and a User equipment (UE) the method comprising:
at the host computer, receiving, from the base station, user data originating from a transmission which the base station has received from the UE, wherein the UE performs any of the steps of any of embodiments 13-16.

47. The method of the previous embodiment, further comprising at the base station, receiving the user data from the UE.

48. The method of the previous two embodiments, further comprising at the base station, initiating a transmission of the received user data to the host computer.

The invention claimed is:

1. A method, performed by a first centralized unit (CU) in a radio access network (RAN) for configuring a user equipment (UE) to communicate via a plurality of distributed units (DUs) in the RAN, the method comprising:
initiating a first radio resource control (RRC) entity to communicate with the UE via a first RRC connection through a first DU;
selecting a second DU to communicate with the UE in a dual-connectivity (DC) configuration with the first DU; and
based on whether the selected second DU is associated with the first CU, determining whether to initiate a second RRC entity, within the first CU, to communicate with the UE via a second RRC connection through the second DU.

2. The method of claim 1, further comprising establishing a first radio bearer with the UE via the first RRC connection through the first DU, wherein the first radio bearer is a first signaling radio bearer (SRB) associated with the first RRC entity.

3. The method of claim 1, further comprising, when the second DU is associated with the first CU, initiating the second RRC entity within the first CU.

4. The method of claim 3, further comprising sending, to the UE via the first RRC connection through the first DU, an RRC message associated with the first RRC entity and comprising an encapsulated RRC message associated with the second RRC entity.

5. The method of claim 2, further comprising receiving, from the UE via the first radio bearer, radio measurements relating to one or more further DUs, wherein the second DU is selected from the one or more further DUs based on the radio measurements.

6. The method of claim 2, further comprising, based on whether the selected second DU is associated with the first CU, determining whether to establish one or more further radio bearers with the UE via the second DU.

7. The method of claim 6, wherein the one or more further radio bearers include at least one of the following:
a second SRB;
a split bearer for the first SRB;
a split bearer for an existing data radio bearer (DRB) established through the first DU; and
one or more further DRBs.

8. The method of claim 7, further comprising, when the second DU is associated with the first CU, establishing the second SRB in association with the second RRC entity.

9. The method of claim 6, wherein:
the one or more further radio bearers include:
   a first further radio bearer comprising one of the following: a second SRB, and a split bearer for the first SRB, and
   a second further radio bearer comprising one of the following:
      a split bearer for an existing data radio bearer (DRB) established through the first DU, and
      one or more further DRBs; and
determining whether to establish the first further radio bearer is performed independently of determining whether to establish the second further radio bearer.

10. The method of claim 9, wherein:
the first further radio bearer is the split bearer for the first SRB;
the second further radio bearer is the split bearer for the existing DRB established via the first RRC connection through the first DU; and
the method further comprises, when the second DU is associated with the first CU:
   establishing the split bearer for the first SRB; and
   refraining from establishing the split bearer for the existing DRB.

11. The method of claim 6, further comprising, when the second DU is associated with the first CU, establishing the one or more further radio bearers in association with a security key that is also associated with the first radio bearer.

12. The method of claim 6, further comprising, when the second DU is associated with the first CU, sending, to the second DU, one or more context setup messages pertaining to the one or more further radio bearers.

13. The method of claim 12, wherein the one or more context setup messages include at least one of the following:
   one or more capabilities of the UE;
   a list of one or more cells that usable for carrier aggregation;
   at least a portion of the radio measurements;
   measurement configurations for use by the second DU; and
   information about the one or more further radio bearers.

14. The method of claim 1, further comprising, when the second DU is not associated with the first CU, sending, to a second CU via an Xn interface, a request to establish one or more further radio bearers via the second DU.

15. The method of claim 1, wherein the first DU and the second DU are configured to utilize different radio access technologies for communicating with the UE.

16. A first centralized unit (CU) in a radio access network (RAN), the first CU being arranged to communicate with one or more user equipment (UE) via a plurality of distributed units (DUs) in the RAN, the first CU comprising:
   network interface circuitry configured to communicate with the plurality of DUs; and
   one or more processors operably coupled with the network interface circuitry and configured to perform operations corresponding to the method of claim 1.

17. A non-transitory, computer-readable medium storing computer-executable instructions that, when executed by one or more processors of a first centralized unit (CU) in a radio access network (RAN), configure the first CU to perform operations corresponding to the method of claim 1.

18. A method for a user equipment (UE) to communicate via a plurality of distributed units (DUs) in a radio access network (RAN), the method comprising:
   initiating a first radio resource control (RRC) entity to communicate with a corresponding first RRC entity in a first centralized unit (CU) via a first RRC connection through a first DU;
   receiving, from the first RRC entity in the first CU, at least one message comprising an encapsulated RRC message that is associated with a second RRC entity in the first CU and that comprises information related to a second DU associated with the first CU; and
   initiating a second RRC entity, in the UE, to communicate with the second RRC entity in the first CU via a second RRC connection through the second DU.

19. The method of claim 18, further comprising establishing a first radio bearer with the first CU via the first RRC connection through the first DU, wherein the first radio bearer is a first signaling radio bearer (SRB) associated with the first RRC entity.

20. The method of claim 18, further comprising sending, to the first CU via the first radio bearer, radio measurements relating to one or more further DUs, wherein the one or more further DUs include the second DU.

21. The method of claim 19, further comprising establishing one or more further radio bearers with the first CU via the second RRC connection through the second DU.

22. The method of claim 21, wherein the one or more further radio bearers include at least one of the following:
   a second SRB;
   a split bearer for the first SRB;
   a split bearer for an existing data radio bearer (DRB) established via the first RRC connection through the first DU; and
   one or more further DRBs.

23. The method of claim 21, wherein:
the one or more further radio bearers include a second SRB; and
the second RRC entity in the UE communicates with the second RRC entity in the CU via the second RRC connection through the second SRB.

24. The method of claim 21, wherein the one or more further radio bearers are established in association with a security key that is also associated with the first radio bearer.

25. A user equipment (UE) configured to communicate with a radio access network (RAN), the UE comprising:
   transceiver circuitry operably configured to communicate with a plurality of distributed units (DUs) in the RAN; and
   one or more processors operably coupled with the transceiver circuitry and configured to perform operations corresponding to the method of claim 18.

26. A non-transitory, computer-readable medium storing computer-executable instructions that, when executed by one or more processors of a user equipment (UE), configure the UE to perform operations corresponding to the method of claim 18.

* * * * *

UNITED STATES PATENT AND TRADEMARK OFFICE
CERTIFICATE OF CORRECTION

PATENT NO. : 10,841,967 B2  
APPLICATION NO. : 16/464330  
DATED : November 17, 2020  
INVENTOR(S) : Teyeb et al.

Page 1 of 1

It is certified that error appears in the above-identified patent and that said Letters Patent is hereby corrected as shown below:

In the Specification

In Column 2, Line 1, delete "channel" and insert -- channel. --, therefor.

In Column 6, Line 61, delete "FIG. 9-12" and insert -- FIGS. 9-12 --, therefor.

In Column 7, Line 7, delete "disclosure" and insert -- disclosure. --, therefor.

In Column 8, Line 58, delete "from both from" and insert -- both from --, therefor.

In Column 12, Line 13, delete "gNB 500)" and insert -- gNB1 500) --, therefor.

In Column 12, Line 17, delete "gNB1 550)" and insert -- gNB2 550) --, therefor.

In Column 12, Line 23, delete "gNB2 500–" and insert -- gNB2 550– --, therefor.

In Column 13, Line 12, delete "setup)" and insert -- setup). --, therefor.

In Column 19, Line 43, delete "which it" and insert -- which --, therefor.

In Column 23, Lines 29-30, delete "Read Only Memory (ROM)," and insert -- Read-Only Memory (ROM), --, therefor.

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*